(12) United States Patent
Joubert et al.

(10) Patent No.: US 12,151,706 B2
(45) Date of Patent: *Nov. 26, 2024

(54) REMOTE LIVE MAP SYSTEM FOR AUTONOMOUS VEHICLES

(71) Applicant: Aurora Operations, Inc., Pittsburgh, PA (US)

(72) Inventors: Niels Joubert, Los Altos, CA (US); Benjamin Kaplan, Denver, CO (US); Stephen O'Hara, Fort Collins, CO (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,173

(22) Filed: Feb. 19, 2024

(65) Prior Publication Data

US 2024/0217546 A1    Jul. 4, 2024

Related U.S. Application Data

(63) Continuation of application No. 18/090,364, filed on Dec. 28, 2022, now Pat. No. 11,938,963.

(51) Int. Cl.
*B60W 60/00* (2020.01)
*B60W 40/10* (2012.01)
(Continued)

(52) U.S. Cl.
CPC .......... *B60W 60/001* (2020.02); *B60W 40/10* (2013.01); *G01C 21/3841* (2020.08);
(Continued)

(58) Field of Classification Search
CPC .............. B60W 60/001; B60W 40/10; B60W 2420/00; B60W 2552/50; B60W 2554/20;
(Continued)

(56) References Cited

U.S. PATENT DOCUMENTS 9,222,795 B1 * 12/2015 Gerlach ............. G01C 21/3492
9,612,123 B1 *  4/2017 Levinson ............... G06V 20/56
(Continued)

FOREIGN PATENT DOCUMENTS

DE    102012212740    5/2014
EP       3073224       9/2016
(Continued)

OTHER PUBLICATIONS

International Search Report and Written Opinion issued for Application No. PCT/US2023/086074, 14 pages, dated Jul. 1, 2024.

*Primary Examiner* — Dale W Hilgendorf
(74) *Attorney, Agent, or Firm* — Gray Ice Higdon

(57) ABSTRACT

A live map system may be used to propagate observations collected by autonomous vehicles operating in an environment to other autonomous vehicles and thereby supplement a digital map used in the control of the autonomous vehicles. In addition, a live map system in some instances may be used to propagate location-based teleassist triggers to autonomous vehicles operating within an environment. A location-based teleassist trigger may be generated, for example, in association with a teleassist session conducted between an autonomous vehicle and a remote teleassist system proximate a particular location, and may be used to automatically trigger a teleassist session for another autonomous vehicle proximate that location and/or to propagate a suggested action to that other autonomous vehicle.

19 Claims, 11 Drawing Sheets

(51) Int. Cl.
*G01C 21/00* (2006.01)
*G08G 1/0967* (2006.01)

(52) U.S. Cl.
CPC ... *G01C 21/3896* (2020.08); *G08G 1/096708* (2013.01); *B60W 2420/00* (2013.01); *B60W 2552/50* (2020.02); *B60W 2554/20* (2020.02); *B60W 2556/40* (2020.02); *B60W 2756/10* (2020.02)

(58) Field of Classification Search
CPC .......... B60W 2556/40; B60W 2756/10; G01C 21/3841; G01C 21/3896; G08G 1/096708
See application file for complete search history.

(56) References Cited

U.S. PATENT DOCUMENTS

| | | | | |
|---|---|---|---|---|
| 11,287,267 | B2* | 3/2022 | Rabel | G01C 21/3841 |
| 11,480,435 | B2* | 10/2022 | Li | G06V 20/56 |
| 11,938,963 | B1* | 3/2024 | Joubert | G01C 21/3841 |
| 2017/0122749 | A1* | 5/2017 | Urano | G01S 19/42 |
| 2017/0248963 | A1* | 8/2017 | Levinson | G05D 1/0297 |
| 2018/0025235 | A1* | 1/2018 | Fridman | G06T 7/70 |
| | | | | 382/103 |
| 2018/0149487 | A1* | 5/2018 | Lee | G01C 21/3841 |
| 2018/0188045 | A1* | 7/2018 | Wheeler | G08G 1/096827 |
| 2018/0349715 | A1* | 12/2018 | Gupta | G08G 1/20 |
| 2019/0265045 | A1* | 8/2019 | Baik | G01C 21/3889 |
| 2019/0325235 | A1* | 10/2019 | Stenneth | G06F 18/217 |
| 2019/0354111 | A1 | 11/2019 | Chen | |
| 2020/0109954 | A1* | 4/2020 | Li | G01C 21/3848 |
| 2020/0160068 | A1* | 5/2020 | Silver | G06F 18/217 |
| 2020/0191601 | A1* | 6/2020 | Jiang | G01C 21/3859 |
| 2020/0192351 | A1* | 6/2020 | Rastoll | G05D 1/0038 |
| 2020/0211370 | A1* | 7/2020 | Chen | G06V 20/588 |
| 2021/0124369 | A1* | 4/2021 | Zander | G06F 16/27 |
| 2021/0233390 | A1* | 7/2021 | Georgiou | G08G 1/04 |
| 2021/0264175 | A1* | 8/2021 | Zhang | G06V 10/751 |
| 2021/0409379 | A1* | 12/2021 | Hwang | G08G 1/0112 |
| 2022/0001872 | A1* | 1/2022 | Taieb | B60W 60/0011 |
| 2022/0340145 | A1* | 10/2022 | Stenneth | B60W 60/001 |
| 2022/0412770 | A1* | 12/2022 | Li | G01C 21/3807 |
| 2023/0137058 | A1* | 5/2023 | Tam | G07C 5/008 |
| | | | | 701/26 |
| 2023/0160713 | A1* | 5/2023 | Xu | B60W 60/00184 |
| | | | | 701/533 |

FOREIGN PATENT DOCUMENTS

| | | | | |
|---|---|---|---|---|
| JP | 2021165787 | | 10/2021 | |
| WO | WO-2018015811 | A1 * | 1/2018 | ............ G01C 21/28 |
| WO | 2018127461 | | 7/2018 | |

* cited by examiner

REMOTE LIVE MAP SYSTEM FOR AUTONOMOUS VEHICLES

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate map data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

A particular challenge, for example, results from the inherently dynamic environment within which autonomous vehicles are expected to operate. Many autonomous vehicles, for example, rely on high resolution digital maps that represent the various static objects in an environment, e.g., including real word objects or elements such as roads, curbs, buildings, trees, signs, etc., as well as logical elements such as lanes, boundaries, etc. Attempts are generally made to maintain and update high quality digital maps to accommodate changes that occur in the environment; however, the overhead associated with verifying and distributing map data to a fleet of autonomous vehicles can be substantial. Furthermore, even with rapid updates, changes may nonetheless arise suddenly in an environment and not be reflected in the map data used by autonomous vehicles operating in the environment.

Moreover, while in some instances an autonomous vehicle's perception system may be used to detect changed circumstances in an environment (e.g., the presence of new construction elements such as cones and/or barrels), the detection range of such a system is generally limited, and can be occluded as a result of the presence of other vehicles nearby, such that the amount of time that an autonomous vehicle may be given to react to some changed circumstances may be undesirably short. As such, a continuing need exists in the art for a manner of improving an autonomous vehicle's awareness of the relevant objects and elements in its environment.

SUMMARY

The present disclosure is related in part to the use of a live map system to propagate observations collected by autonomous vehicles operating in an environment to other autonomous vehicles and thereby supplement a digital map used in the control of the autonomous vehicles. In addition, a live map system in some instances may be used to propagate location-based teleassist triggers to autonomous vehicles operating within an environment. A location-based teleassist trigger may be generated, for example, in association with a teleassist session conducted between an autonomous vehicle and a remote teleassist system proximate a particular location, and may be used to automatically trigger a teleassist session for another autonomous vehicle proximate that location and/or to propagate a suggested action to that other autonomous vehicle.

Therefore, consistent with one aspect of the invention, an autonomous vehicle control system may include one or more processors, and memory storing instructions that, when executed by the one or more processors, cause the autonomous vehicle control system to receive a digital map of a portion of an environment within which an autonomous vehicle operates, the digital map defining a plurality of static elements within the portion of the environment, receive, from a remote live map system, observation data associated with one or more observations collected from the environment, augment the digital map with the observation data to generate an augmented digital map, and control the autonomous vehicle using the augmented digital map.

In some implementations, the one or more processors are configured to control the autonomous vehicle using the augmented digital map by determining a trajectory for the autonomous vehicle using the augmented digital map, and controlling the autonomous vehicle in accordance with the trajectory.

Also, in some implementations, the observation data is first observation data, and the one or more processors are further configured to receive second observation data collected using one or more sensors of the autonomous vehicle, and augment the digital map with the second observation data such that the augmented digital map is augmented using the first and second observation data. Further, in some implementations, the one or more processors are further configured to communicate the second observation data to the remote live map system for use in controlling one or more other autonomous vehicles operating in the environment.

In some implementations, the one or more observations collected from the environment are collected and communicated to the remote live map system by one or more other autonomous vehicles operating in the environment. In addition, in some implementations, the observation data defines a construction element detected in the environment. In some implementations, the observation data defines a blockage region in the environment that restricts vehicle movement within the environment. In addition, in some implementations, the observation data defines one or more vehicle paths, each vehicle path associated with a detected path of a different vehicle when traveling through the environment, and the one or more processors are configured to control the autonomous vehicle using the augmented digital map by using the one or more vehicle paths to determine a path of motion for the autonomous vehicle.

Moreover, in some implementations, the observation data defines a sub-optimal action performed by another autonomous vehicle when traveling through the environment, and the one or more processors are configured to control the autonomous vehicle using the augmented digital map by using the sub-optimal action to determine a path of motion for the autonomous vehicle. In some implementations, the one or more processors are further configured to receive, from the remote live map system, a location-based teleassist trigger, and determine activation of the location-based teleassist trigger based at least in part on a location-based criterion associated with the location-based teleassist trigger.

Moreover, in some implementations, the one or more processors are further configured to, in response to determining activation of the location-based teleassist trigger, automatically initiate a teleassist session with a remote teleassist system. In some implementations, the one or more processors are further configured to, in response to determining activation of the location-based teleassist trigger, control the autonomous vehicle based at least in part on a suggested action associated with the location-based teleassist trigger. In addition, in some implementations, the one or more processors are configured to control the autonomous vehicle based at least in part on the suggested action associated with the location-based teleassist trigger without initiating a teleassist session with a remote teleassist system. In some implementations, the suggested action is received from the remote live map system and generated from a different teleassist session with a different autonomous vehicle.

Consistent with another aspect of the invention, a method of operating an autonomous vehicle with an autonomous vehicle control system may include receiving a digital map of a portion of an environment within which the autonomous vehicle operates, the digital map defining a plurality of static elements within the portion of the environment, receiving, from a remote live map system, observation data associated with one or more observations collected from the environment, augmenting the digital map with the observation data to generate an augmented digital map, and controlling the autonomous vehicle using the augmented digital map.

Consistent with another aspect of the invention, an autonomous vehicle control system may include one or more processors, and memory storing instructions that, when executed by the one or more processors, cause the autonomous vehicle control system to receive a digital map of a portion of an environment within which an autonomous vehicle operates, the digital map defining a plurality of static elements within the portion of the environment, determine, based upon sensor data collected using one or more sensors of the autonomous vehicle, observation data associated with one or more observations collected from the environment, augment the digital map with the observation data to generate an augmented digital map, control the autonomous vehicle using the augmented digital map, and communicate the observation data to a remote live map system for use in controlling one or more other autonomous vehicles operating in the environment.

Moreover, in some implementations, the one or more processors are configured to control the autonomous vehicle using the augmented digital map by determining a trajectory for the autonomous vehicle using the augmented digital map, and controlling the autonomous vehicle in accordance with the trajectory.

Also, in some implementations, the observation data is first observation data, and the one or more processors are further configured to receive, from the remote live map system, second observation data associated with one or more observations collected from the environment, and augment the digital map with the second observation data such that the augmented digital map is augmented using the first and second observation data. In some implementations, the observation data defines a construction element detected in the environment using a sensor of the autonomous vehicle. In addition, in some implementations, the observation data defines a blockage region in the environment that restricts vehicle movement within the environment.

Also, in some implementations, the observation data defines one or more vehicle paths, each vehicle path associated with a detected path of a different vehicle when traveling through the environment or the path of the autonomous vehicle, and the one or more processors are configured to communicate the observation data to the remote live map system by communicating the one or more vehicle paths to the remote live map system for use in controlling the one or more other autonomous vehicles operating in the environment.

Moreover, in some implementations, the observation data defines a sub-optimal action performed by the autonomous vehicle when traveling through the environment, and the one or more processors are configured to communicate the observation data to the remote live map system by communicating the sub-optimal action to the remote live map system for use in controlling the one or more other autonomous vehicles operating in the environment.

Consistent with another aspect of the invention, a method of operating an autonomous vehicle with an autonomous vehicle control system may include receiving a digital map of a portion of an environment within which the autonomous vehicle operates, the digital map defining a plurality of static elements within the portion of the environment, determining, based upon sensor data collected using one or more sensors of the autonomous vehicle, observation data associated with one or more observations collected from the environment, augmenting the digital map with the observation data to generate an augmented digital map, controlling the autonomous vehicle using the augmented digital map, and communicating the observation data to a remote live map system for use in controlling one or more other autonomous vehicles operating in the environment.

Consistent with another aspect of the invention, a method of operating an autonomous vehicle may include receiving, from a remote live map system, observation data associated with one or more observations collected from the environment, where the observation data defines a plurality of vehicle paths, each vehicle path associated with a detected path of a different vehicle when traveling through the environment, motion planning using the received observation data to generate a path of motion for the autonomous vehicle based at least in part on the plurality of vehicle paths, and controlling the autonomous vehicle using the path of motion.

Further, in some implementations, a first vehicle path among the plurality of vehicle paths is associated with a detected path of a first vehicle that is detected using one or more sensors of a second vehicle operating within the environment. Also, in some implementations, the first vehicle is a non-autonomous vehicle. Further, in some implementations, multiple vehicle paths among the plurality of vehicle paths are associated with non-autonomous vehicles. In some implementations, the observation data further includes a sub-optimal action performed by another autonomous vehicle when traveling through the environment, and motion planning using the received observation data to generate the path of motion for the autonomous vehicle is further based at least in part on the sub-optimal action.

Consistent with another aspect of the invention, a method may include conducting a teleassist session with a first autonomous vehicle operating in an environment, including exchanging situational data and teleassist operator input between the first autonomous vehicle and a remote teleassist system, generating a location-based teleassist trigger in association with the teleassist session, and communicating the location-based teleassist trigger to a remote live map system to cause the remote live map system to forward the location-based teleassist trigger to a second autonomous vehicle.

Also, in some implementations, the location-based teleassist trigger includes a session suggestion that selectively suggests automatic initiation of a teleassist session with the second autonomous vehicle when the second autonomous vehicle satisfies a location-based criterion associated with the location-based teleassist trigger. In some implementations, the location-based teleassist trigger includes a suggested action to be undertaken by the second autonomous vehicle when the second autonomous vehicle meets a location-based criterion associated with the location-based teleassist trigger.

Some implementations may also include, in the first autonomous vehicle, receiving, from the remote live map system, observation data associated with one or more observations collected from the environment and controlling the autonomous vehicle using the received observation data. Some implementations may further include selectively propagating observation data collected in association with the remote teleassist system to the remote live map system in response to teleassist operator input.

Consistent with another aspect of the invention, a method may include receiving, from a remote live map system, observation data associated with one or more observations collected from an environment within which a first autonomous vehicle operates, controlling the first autonomous vehicle using the observation data, receiving, from the remote live map system, a location-based teleassist trigger generated in association with a teleassist session conducted between a remote teleassist system and a second autonomous vehicle, and determining activation of the location-based teleassist trigger in response to determining that the first autonomous vehicle meets a location-based criterion associated with the location-based teleassist trigger.

In some implementations, the teleassist session is a first teleassist session, the location-based teleassist trigger includes a session suggestion that selectively suggests automatic initiation of a second teleassist session, and the method further includes automatically initiating the second teleassist session between the remote teleassist system and the first autonomous vehicle when the first autonomous vehicle meets the location-based criterion associated with the location-based teleassist trigger. Further, in some implementations, the location-based teleassist trigger includes a suggested action to be undertaken by the first autonomous vehicle, and the method further includes controlling the first autonomous vehicle based at least in part on the suggested action.

Consistent with another aspect of the invention, a live map system may include one or more processors, and memory storing instructions that, when executed by the one or more processors, cause the live map system to maintain observation data associated with a plurality of observations collected by a plurality of autonomous vehicles operating in an environment, maintain a location-based teleassist trigger generated in association with a teleassist session conducted between a remote teleassist system and a first autonomous vehicle of the plurality of autonomous vehicles, and communicate a portion of the observation data and the location-based teleassist trigger to a second autonomous vehicle of the plurality of autonomous vehicles for use in controlling the second autonomous vehicle.

Some implementations may also include an autonomous vehicle and/or a system that is remotely located from an autonomous vehicle and includes one or more processors that are configured to perform various of the methods described above. Some implementations may also include an autonomous vehicle control system including one or more processors, a computer readable storage medium, and computer instructions resident in the computer readable storage medium and executable by the one or more processors to perform various of the methods described above. Still other implementations may include a non-transitory computer readable storage medium that stores computer instructions executable by one or more processors to perform various of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The various implementations discussed hereinafter are generally directed in part to a live map system for use with an autonomous vehicle to supplement a digital map. Prior to a discussion of these implementations, however, an example hardware and software environment within which the various techniques disclosed herein may be implemented will be discussed.

Hardware and Software Environment

Figure 1:
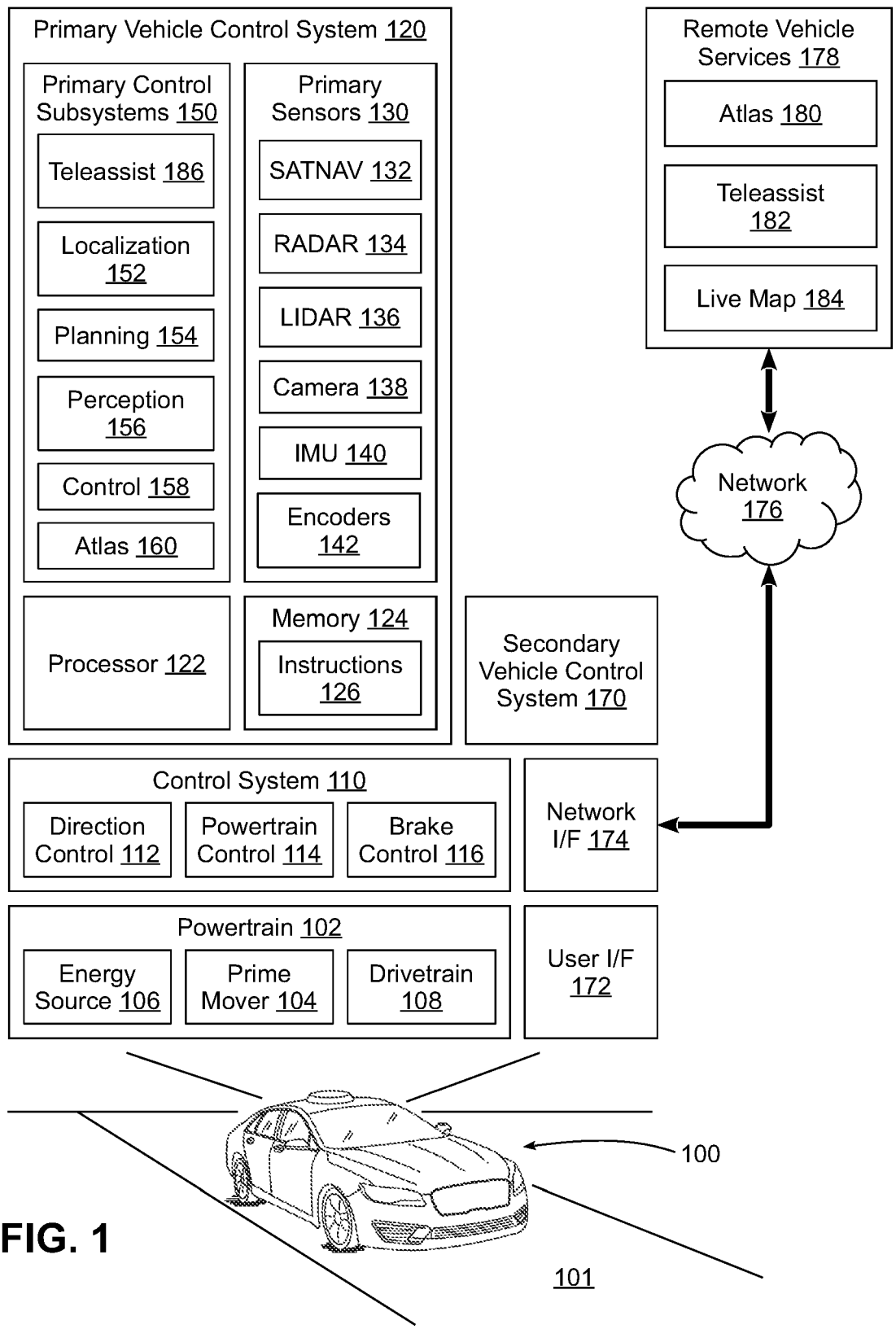
FIG. 1 illustrates an example hardware and software environment for an autonomous vehicle.

Turning to the Drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114 and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134, 136, as well as a digital camera 138 (which may include various types of image capture devices capable of capturing still and/or video imagery), may be used to sense stationary and moving objects within the immediate vicinity of a vehicle. An inertial measurement unit (IMU) 140 may include multiple gyroscopes and accelerometers capable of detection linear and rotational motion of a vehicle in three directions, while one or more wheel encoders 142 may be used to monitor the rotation of one or more wheels of vehicle 100.

The outputs of sensors 132-142 may be provided to a set of primary control subsystems 150, including, a localization subsystem 152, a planning subsystem 154, a perception subsystem 156, and a control subsystem 158. Localization subsystem 152 is principally responsible for precisely determining the location and orientation (also sometimes referred to as "pose", which in some instances may also include one or more velocities and/or accelerations) of vehicle 100 within its surrounding environment, and generally within some frame of reference. Planning subsystem 154 is principally responsible for planning a path of motion for vehicle 100 over some timeframe given a desired destination as well as the static and moving objects within the environment, while perception subsystem 156 is principally responsible for detecting, tracking and/or identifying elements within the environment surrounding vehicle 100. Control subsystem 158 is principally responsible for generating suitable control signals for controlling the various controls in control system 110 in order to implement the planned path of the vehicle. Any or all of localization subsystem 152, planning subsystem 154, perception subsystem 156, and control subsystem 158 may have associated data that is generated and/or utilized in connection with the operation thereof, and that which may be communicated to a teleassist system in some implementations.

In addition, an atlas or map subsystem 160 may be provided in the illustrated implementations to describe the elements within an environment and the relationships therebetween. Atlas subsystem 160 may be accessed by each of the localization, planning and perception subsystems 152-156 to obtain various information about the environment for use in performing their respective functions. Atlas subsystem 160 may be used to provide map data to the autonomous vehicle control system, which may be used for various purposes in an autonomous vehicle, including for localization, planning, and perception, among other purposes. Map data may be used, for example, to lay out or place elements within a particular geographical area, including, for example, elements that represent real world objects such as roadways, boundaries (e.g., barriers, lane dividers, medians, etc.), buildings, traffic devices (e.g., traffic or road signs, lights, etc.), as well as elements that are more logical or virtual in nature, e.g., elements that represent valid pathways a vehicle may take within an environment, "virtual" boundaries such as lane markings, or elements that represent logical collections or sets of other elements. Map data may also include data that characterizes or otherwise describes elements in an environment (e.g., data describing the geometry, dimensions, shape, etc. of objects), or data that describes the type, function, operation, purpose, etc., of elements in an environment (e.g., speed limits, lane restrictions, traffic device operations or logic, etc.). In some implementations, atlas subsystem 160 may provide map data in a format in which the positions of at least some of the elements in a geographical area are defined principally based upon relative positioning between elements rather than any absolute positioning within a global coordinate system. It will be appreciated, however, that other atlas or map systems suitable for maintaining map data for use by autonomous vehicles may be used in other implementations, including systems based upon absolute positioning. Furthermore, it will be appreciated that at least some of the map data that is generated and/or utilized by atlas subsystem 160 may be communicated to a teleassist system in some implementations.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating autonomous vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 172 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which vehicle 100 receives environmental and other data for use in autonomous control thereof. In the illustrated implementations, for example, vehicle 100 may be in communication with various cloud-based remote vehicle services 178 including, at least for the purposes of implementing various functions described herein, an atlas or map service or system 180, a teleassist service or system 182, and a live map service or system 184. Atlas or map service or system 180 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Teleassist service or system 182 may be used, for example, to provide teleassist support to vehicle 100, e.g., through communication with a teleassist subsystem 186 resident in primary vehicle control system 120, as will be discussed in greater detail below. Live map service or system 184 may be used to propagate various observations collected by one or more autonomous vehicles to effectively supplement the global repository maintained by atlas or map service or system 180. The terms "service" and "system" are generally used interchangeably herein, and generally refer to any computer functionality capable of receiving data from, and providing data to, an autonomous vehicle. In many instances, these services or systems may be considered to be remote services or systems insofar as they are generally external to an autonomous vehicle and in communication therewith.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Teleassist System

Operating an autonomous vehicle in the complex and dynamic environments within which automobiles regularly operate often necessitates handling a diverse array of conditions that, while comparatively uncommon, are still regularly encountered by many autonomous vehicles over time. Autonomously handling these uncommon conditions in a performant way can be challenging, and some proposed approaches to addressing these uncommon conditions incorporate the use of teleassist, or "human-in-the-loop" technology, to enable a human operator, who may be remote from the vehicle, to make decisions and assist in guiding a vehicle whenever some of these uncommon conditions are encountered by the vehicle.

Some proposed teleassist approaches focus on direct control of a vehicle by a remote operator, whereby the operator is provided with sensor data collected by the vehicle and is able to directly control the vehicle from a remote location. It has been found, however, that direct control of a vehicle in such circumstances generally requires a fast, responsive and reliable network connection between the remote operator and the autonomous vehicle. Network connectivity and latency for an autonomous vehicle, however, can vary considerably based upon location (e.g., urban or rural, highway or side road, etc.) and network congestion. In addition, remote operators, even when provided with sensor data collected by a vehicle, may still lack full situational awareness due to the fact that they are not physically within the vehicle.

Many of the disclosed implementations discussed hereinafter, on the other hand, may focus on an indirect control methodology whereby a teleassist service or system is able to provide suggestions or recommendations to an autonomous vehicle, while requiring any such directives or recommendations to be validated by the autonomous vehicle prior to being implemented. By doing so, performance of the vehicle may be effectively decoupled from the performance of the network that links the teleassist service or system with the autonomous vehicle.

Figure 2:
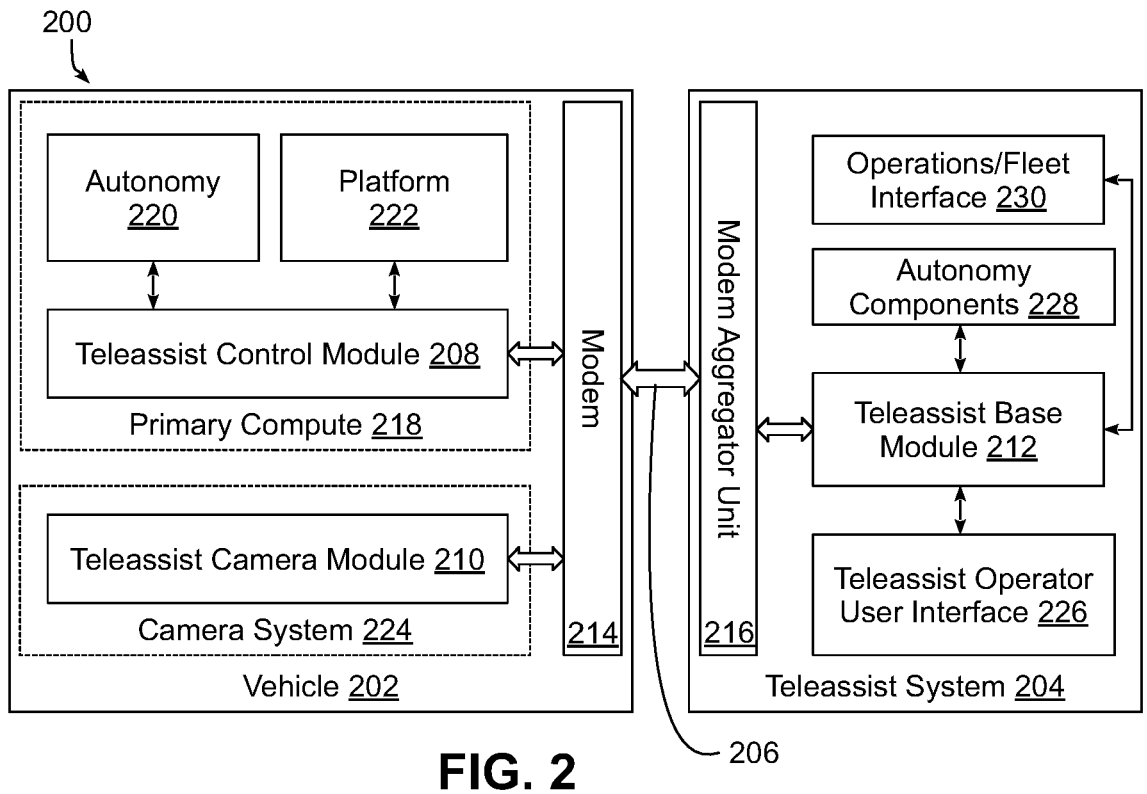
FIG. 2 is a block diagram illustrating an example teleassist-enabled system consistent with some implementations.

FIG. 2, for example, illustrates one example implementation of a teleassist-enabled system or service 200 whereby an autonomous vehicle 202 interfaces with a remote teleassist system 204 over a network 206. Remote teleassist system 204 may be physically remote from autonomous vehicle 202, and will generally support interface with multiple vehicles to enable multiple teleassist operators to concurrently interact with multiple vehicles. As will become more apparent below, teleassist operators may actively and continuously monitor individual vehicles in some implementations, while in other implementations, individual teleassist operators may interact with multiple vehicles at different times, e.g., so that a particular operator may support multiple vehicles at one time. In some implementations, for example, teleassist operators may be selectively coupled to particular autonomous vehicles on an on-demand basis, e.g., in response to requests generated by the vehicles whenever certain conditions (e.g., various uncommon situations that may benefit from teleassist support) arise. In some implementations, a pool of operators may support a pool of autonomous vehicles, and a teleassist system may initiate teleassist sessions on an on-demand basis, e.g., based upon requests initiated by autonomous vehicles, the teleassist system, or both.

Teleassist support may be implemented in some implementations using a teleassist control module 208 and a teleassist camera module 210 in autonomous vehicle 202 in communication with a teleassist base module 212 in teleassist system 204. Modules 208 and 210 of vehicle 202 may be coupled to network 206 through a modem 214, while module 212 of teleassist system 204 may be coupled to network 206 through a modem aggregator unit 216 capable of communicating with multiple modems 214 of multiple autonomous vehicles 202. Network 206 may be implemented in part using a wireless network such as a 4G, LTE or 5G network, a satellite network, or some combination thereof, although the invention is not so limited.

Teleassist control module 208 may be resident in some implementations within a primary compute system 218 of vehicle 202, and may interface with each of an autonomy system 220 and platform 222 of the vehicle to collect and stream data from the primary compute system to teleassist system 204 as well as receive and process operator inputs received from teleassist system 204. In some implementations, primary compute system 218 may be implemented in a similar manner to primary vehicle control system 120 illustrated in FIG. 1, with autonomy system 220 representing high level autonomous control subsystems such as localization, planning, perception, etc., and with platform 222 representing lower level vehicle controls such as provided by control subsystem 158. However, it will be appreciated that teleassist control module 208 may interface with any autonomy or control-related aspect of vehicle 202 in other implementations.

Teleassist camera module 210 may be resident in some implementations within a camera system 224 that manages the on-board cameras on vehicle 202, and module 210 may, in some implementations, stream camera feed data collected from the on-board cameras to teleassist system 204 for viewing by an operator during a teleassist session. In some implementations module 210 may dynamically vary the data streamed from the on-board cameras, e.g., to vary the priority, quality and/or resolution of each camera feed.

While modules 208 and 210 are implemented separately in FIG. 2, in other implementations, the functionality allocated to each module may vary, or the functionality may be combined into a single module or split into more than two modules. As such, the invention is not limited to the particular architecture illustrated in FIG. 2.

Teleassist base module 212 communicates with modules 208 and 210 during a teleassist session with vehicle 202, and may further manage multiple sessions for multiple vehicles and with multiple operators. Module 212 may also manage scheduling, initiation and termination of sessions in some implementations.

A teleassist operator user interface 226 is coupled to module 212 to provide a user interface through which an operator, e.g., a human operator, may communicate with a vehicle 202 during a session. The user interface may be implemented in any number of suitable manners, and may utilize text, graphics, video, audio, virtual or augmented reality, keyboard input, mouse input, touch input, voice input, gesture input, etc. Dedicated or customized controls and/or indicators may also be used in some implementations. In addition, in some implementations an application, e.g., as may execute on a desktop computer or laptop computer, a mobile device, etc. may be utilized to interact with an operator, while in other implementations a web-based or remote interface may be used. In one example implementation discussed in greater detail below, for example, interface 226 may be a web-based interface that interacts with an operator via a touchscreen display.

Teleassist system 204 may also include one or more autonomy components 228 interfaced with module 212. Autonomy components 228 may include various components that replicate the functionality of similar components in vehicle 202 and/or that are also accessible to a vehicle for use in connection with the primary control of the vehicle (e.g., components 240, 242 and 244 discussed below in connection with FIG. 3). For example, in some implementations, module 212 may have access to the same map data utilized by each vehicle, e.g., as provided by an atlas system as described above, as well as to similar layout functionality as is used by each vehicle to lay out map data in the immediate vicinity of a vehicle. By doing so, module 212 may effectively reconstruct a digital map of at least the static objects in the vicinity around a vehicle without having to receive the entire digital map from the vehicle itself, thereby reducing the volume of data streamed by the vehicle for the purpose of reconstructing the environment around the vehicle. In some implementations, the vehicle may provide a current pose of the vehicle as well as data regarding any dynamic entities detected by the perception system (e.g., other vehicles, pedestrians, or other actors or objects detected in the environment but not represented in the map data), and from this more limited amount of data, a graphical depiction of the immediate vicinity around a vehicle may be generated for display to a teleassist operator. In some implementations, autonomy components may also replicate functionality implemented in vehicle 202 to enable local assessment of how a vehicle may respond to certain directives from the teleassist system, and in some implementations, autonomy components may have similar functionality to that implemented in vehicle 202, but with greater capabilities and/or access to greater computing resources than may be available in the vehicle.

Moreover, in some implementations, a teleassist system may be autonomous in nature as well, whereby the teleassist system is effectively the teleassist operator with which an autonomous vehicle interacts during a teleassist session. In such instances, the teleassist system may assess the current context of an autonomous vehicle and send commands, requests, directives, suggestions, etc. for addressing any conditions that triggered a teleassist session. In some implementations, for example, a teleassist system may have access to more compute power than can practically be provided onboard an autonomous vehicle, and thus the teleassist system may be capable of performing computationally complex evaluations to assist an autonomous vehicle.

Teleassist system 204 may also include an operations/fleet interface 230 to facilitate communication with other services and/or systems that support autonomous vehicles. For example, it may be desirable in some implementations to provide an ability to request roadside assistance or recovery of an autonomous vehicle, or to provide log data for use in diagnosing vehicle issues. It may also be desirable to propagate data collected during a teleoperation session (e.g., data related to lane closures, detected construction or incidents, etc.) to other vehicles in a fleet. Moreover, data received and/or generated by the teleassist system may be used as training data for further training various components of an autonomous vehicle, e.g., to improve the performance of a detector and reduce the occurrence of false positives, or to improve scenario selection and other decisions made by the autonomous vehicle in response to certain sensor input. Other external services and/or systems may also interface with a teleassist system in other implementations, as well be apparent to those of ordinary skill having the benefit of the instant disclosure.

Figure 3:
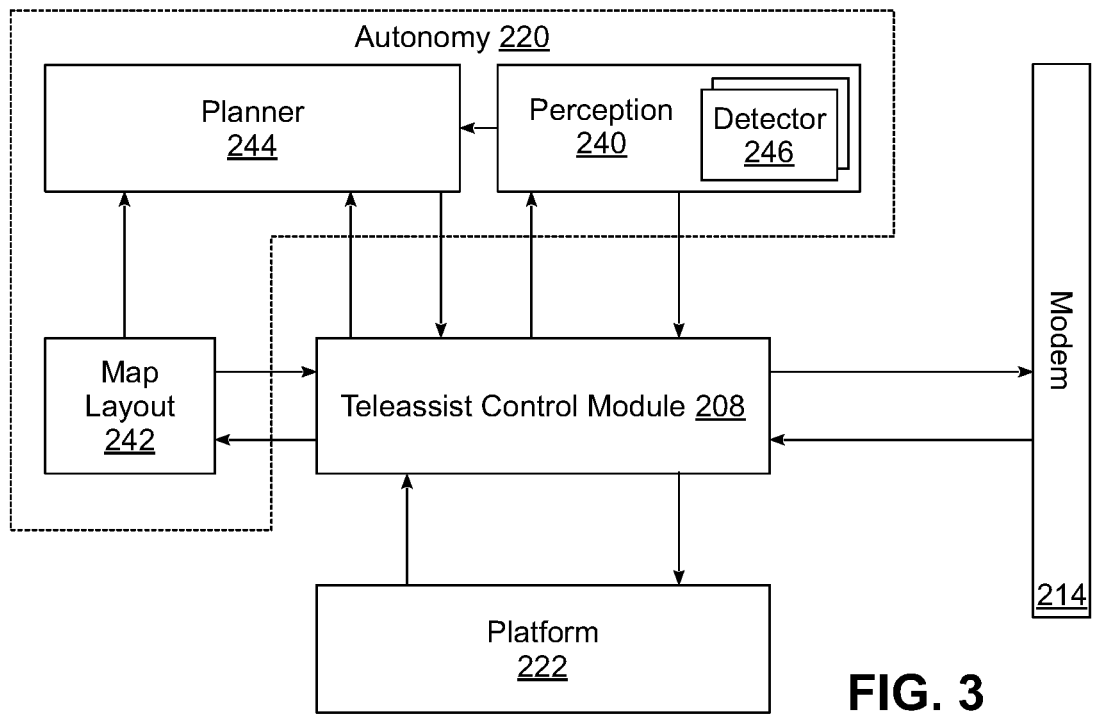
FIG. 3 is a block diagram further illustrating the teleassist control module referenced in FIG. 2.

Now turning to FIG. 3, an example implementation of teleassist control module 208 and the various interfaces supported thereby are illustrated in greater detail. In some implementations, for example, module 208 may include interfaces, e.g., application programming interfaces (APIs) to teleassist system 204 (via modem 214), to platform 222, and to each of a perception component 240, map layout component 242, and planner component 244 of autonomy component 220.

For the interface with teleassist system 204, teleassist control module 208 may be configured to communicate autonomy data (e.g., map data, perception data, route data, planning data), sensor data, telemetry data, etc. to teleassist system 204 to provide the teleassist system with the current status of the vehicle. Teleassist control module 208 may also be configured to communicate various teleassist requests to teleassist system 204 and receive various teleassist commands therefrom. Further, teleassist control module 208 may be configured to receive requests for visualizations and communicate requested visualizations to teleassist system 204.

For the interface with platform 222, teleassist control module 208 may be configured to receive vehicle state information from the platform (e.g., various types of diagnostic and/or sensor data), and to issue various lower level commands to the platform, e.g., to honk a horn, activate or deactivate hazard lights, change gears, decommission the vehicle, initiate a controlled stop, etc.

For the interface with perception component 240, teleassist control module 208 may be configured to receive from the perception component actors and/or tracks of actors detected in the environment, detections by various detectors 246 implemented in the perception component, and other perception-related data. All of such data may be communicated by module 208 to a teleassist system as autonomy data.

For the interface with map layout component 242, teleassist control module 208 may receive, for example, local map data, route data and other map-related data from map layout component 242. Module 208 may also, in some instances, communicate map patches to map layout component 242, e.g., to generate lane closures, traffic device overrides, new destinations, virtual path suggestions, etc., or to clear out prior generated map patches applied to the local map stored in component 242, e.g., when a prior lane closure has been removed. Map layout component 242 may also, in some instances, forward map and route updates to planner component 244 to update scenarios being contemplated by the planner component during the operation of the autonomous vehicle.

For the interface with planner component 244, teleassist control module 208 may receive, for example, generated plans, actor properties, alternate scenarios and other planning-related data. Teleassist control module 208 may also forward various teleassist commands to planner component 244, as well as receive teleassist requests and/or feedback to teleassist commands from planner component 244.

Other functionality and variations will be appreciated by those of ordinary skill having the benefit of the instant disclosure. Therefore, the invention is not limited to the specific teleassist system implementations discussed herein.

Remote Live Map System for Autonomous Vehicles

It will be appreciated that an autonomous vehicle may desirably be aware of the objects and elements in its environment far enough in advance to have sufficient time to react to them. This is especially important for stationary objects in the lane in which the autonomous vehicle is traveling, such as construction elements (e.g., cones and barrels) that define a construction zone and/or block off part of a roadway. While the sensors and perception system of an autonomous vehicle may be able to detect such objects and elements, in many instances the detection range is such that some objects will not be detectable as early as would be desired in order to appropriately navigate through a construction zone. In some instances, road signs alerting drivers of upcoming construction zones may be detected and used to provide earlier notice of potential lane closures; however, even when road signs are present, the sensors of a vehicle may be occluded by surrounding vehicles and may fail to provide an autonomous vehicle with sufficient advance notification. As an example, an autonomous vehicle operating in traffic on a roadway following and driving alongside relatively tall commercial trucks and vans may have little visibility of road signs or of the road ahead. In addition, whereas a teleassist system could potentially be of use in navigating an autonomous vehicle through a construction zone, if the autonomous vehicle has insufficient notice of the presence of the construction zone (e.g., due to occlusion of road signs by other vehicles), there may not be sufficient time to establish a teleassist session before encountering the construction zone.

Offline map data, e.g., as maintained in a global repository and used to represent the static objects or elements in an environment, may include some construction-related information about the environment. Particularly for long term construction projects, lane closures or changes may be weeks or months in duration, and thus may be incorporated into the offline map data used by autonomous vehicles operating in the environment. Nonetheless, the update cycle for such map data is typically a heavyweight offline process that may take several days to complete, so any temporary construction zones, or any changes to longer term construction zones (e.g., changing which lanes are closed) may not be immediately reflected in the offline map data used by an autonomous vehicle. Discrepancies between offline map data and what an autonomous vehicle perceives in real-time may pose navigation and motion planning challenges.

In some implementations of the invention, however, a live map service or system may be used to supplement offline map data used by an autonomous vehicle with various observations collected by various autonomous vehicles operating in the same environment. In particular, in some implementations, a live map system may be configured to receive observation data from one or more autonomous vehicles operating in an environment, maintain the observation data within a data store, and then propagate the observation data to one or more autonomous vehicles operating in the environment, thereby making the observation data generated by some autonomous vehicles in the environment available to other autonomous vehicles for use in controlling those other autonomous vehicles.

Observation data, in this regard, may be considered to include various types of data associated with one or more observations collected from an environment and usable by an autonomous vehicle control system in connection with controlling the autonomous vehicle thereof. In some instances, observation data may be associated with perception observations, which may be considered to include observations that are sensed by one or more sensors of an autonomous vehicle and/or derived from data sensed by such sensors, e.g., sensor data such as image data, LIDAR data, telemetry data, etc., as well as tracks, paths and/or locations of objects or elements sensed in the environment, including, but not limited to, static or stationary objects or elements, dynamic or moving objects or elements, physical objects or elements, logical objects or elements, etc. In some implementations, for example, observation data based upon perception observations may include tracks of signs and/or construction elements detected in an environment (e.g., cones, barrels, Jersey barriers, etc.), tracks of other vehicles, pedestrians and/or other moving objects within the environment, physical and/or logical boundaries of roadways (e.g., defining lanes, shoulders, etc.), and blockage regions representing non-drivable areas, among others. A blockage region, in some implementations, may be used to define a region of a digital map that is closed to traffic, and may be used in some instances, for example, to represent a plurality of associated construction elements detected in the environment, and thereby avoid the need to track all of the construction elements individually. Observation data may also include data associated with accident scenes, e.g., police cars, cones, or other construction elements temporarily placed in the roadway to block off an accident scene, blockage regions defined thereby, tracks of other vehicles navigating around the accident scene, etc.

Observation data may also be associated with operational observations that are based upon the decisions made and/or operations performed by an autonomous vehicle while operating within the environment and/or performance assessments of such decisions and/or operations (e.g., whether a decision was adjudged to be a good or bad decision, whether a determined motion plan provided for smooth and efficient operation of the autonomous vehicle, etc.). In some implementations, for example, observation data based upon operational observations may include determined motion plans and relative performance thereof, and in some instances, identified optimal and/or sub-optimal actions. Optimal actions may include, for example, actions or operations that were determined to provide desired performance of an autonomous vehicle when reacting to a particular situations, while sub-optimal actions may include actions or operations undertaken by an autonomous vehicle that were determined to provide sub-optimal performance, e.g., where a motion plan requires a sudden correction in direction and/or speed, requires the autonomous vehicle to stop or pull over to the side of the road and/or subjects an autonomous vehicle and its passengers to undesirable forces (e.g., riding over bumps too quickly, turning quickly, slowing down quickly, etc.).

A live map system or service may therefore be considered to provide an "online" map system that provides relatively current observation data collected by other autonomous vehicles, sometimes in real time or in near-real time, as opposed to an "offline" map system such as an atlas system that generally provides relatively stable representations of the static objects or elements (including physical objects or elements such as road boundaries, buildings, etc. and logical objects such as lanes, intersections, traffic signals, etc.). In the illustrated implementations, a live map system may be distinguished from an offline map system based upon the currency of information (e.g., minutes or hours vs. days or weeks), based upon the manner of propagating to autonomous vehicles (e.g., based upon an autonomous vehicle's current location and requested on-demand by an autonomous vehicle or pushed by the live map system vs. released to a fleet of autonomous vehicles via a versioned update), and/or based upon the degree of validation and/or quality assurance (e.g., based upon little or no validation and/or quality assurance in a live map system vs. comprehensive validation and quality assurance prior to being propagated as an offline map update). In addition, in some implementations, a live map system may be distinguished from an offline map system based upon the fact that the observation data propagated by a live map system may be based on the observations of individual autonomous vehicles while the map data maintained in an offline map system may be based primarily upon aggregated observations collected by and/or verified by multiple autonomous vehicles. Of note, for the purposes of this disclosure, and unless expressly stated otherwise, the terms "object" and "element" may be considered to be synonymous with one another.

Within the context of the disclosure, the map data provided by an offline map system such as an atlas system (which may be referred to as offline map data) may be used to generate a digital map representing the environment within which an autonomous vehicle operates. In some implementations, such a digital map may be referred to as a road region layout. While in some implementations, the offline map data may be supplied by a remote offline map system while an autonomous vehicle operates within the environment, in other implementations, the offline map data is stored in the autonomous vehicle and is available locally during operation, with updates to the offline map data provided periodically, e.g., through versioned updates released to a fleet.

In addition, the observation data provided by a live map system may be used to augment the offline map data used to generate a digital map to generate an augmented digital map in which the observation data is effectively "fused" with the offline map data, e.g., by supplementing the offline map data (e.g., by adding blockage regions, boundaries, construction elements, signs, etc.) and/or superseding or overriding the offline map data (e.g., by closing normally-drivable area to traffic and/or opening previously non-drivable areas). In some implementations, where a digital map is implemented as a road region layout, the observation data may be used to generate an augmented road region layout.

In addition, as will be appreciated from the discussion below, such augmentation of a digital map may be implemented using a map fusion or similar functional component of an autonomous vehicle control system that fuses additional information with the digital map or augmented digital map, including, for example, perception observations generated from sensor data of the autonomous vehicle, e.g., the tracks of detected signs, construction elements, and other objects and elements detected in the environment, as well as various perceived lane boundaries detected in the environment. In addition, in some implementations a map fusion or similar functional component may additionally fuse information received from a remote teleassist system, e.g., suggested paths, blockage regions, etc.

While an augmented digital map may be useful for other operations in connection with the operation of an autonomous vehicle, the disclosure hereinafter primarily focuses on the use of such an augmented digital map in performing motion planning, which may be considered to include any functionality or algorithm suitable for generating a path of motion for an autonomous vehicle over a relatively short time frame (as opposed to route planning, which is more concerned with navigation via a route to a particular geographic destination without concern for the actual path the autonomous vehicle takes within the roadways over which it travels while following the route).

In some implementations, for example, the observation data may include the paths of one or more vehicles (including autonomous and/or non-autonomous vehicles) when navigating through an area, which may allow a motion planner to select a path of motion for the autonomous vehicle that is based upon these other vehicle paths. Thus, for example, if multiple non-autonomous vehicles follow a particular path through a tricky construction zone (e.g., to change lanes, or even change over to the other side of a divided highway), the motion planner may use these vehicle paths to generate a similar path of motion for the autonomous vehicle. Similarly, for any sub-optimal actions represented in the observation data, a motion planner may use these actions to reject potential paths of motion that would result in these sub-optimal actions. Thus, where another autonomous vehicle follows a particular path of motion through a tricky construction zone that results in a need to suddenly correct the direction and/or speed of the autonomous vehicle, that path of motion may be provided to other autonomous vehicles to enable those other autonomous vehicle to reject similar paths of motion generated via motion planning.

Furthermore, a map fusion or similar functional component may also be used to provide observation data collected by an autonomous vehicle to the live map system for propagation to other autonomous vehicles operating in the environment.

As will also be discussed in greater detail, in some implementations a live map service may also be usable to propagate teleassist-related information to autonomous vehicles operating in an area. In some implementations, such information may include location-based teleassist triggers, which may be considered to include teleassist information that is associated with a particular location-based criterion that, when satisfied, may be used to automatically trigger a teleassist session and/or provide teleassist-generated guidance to an autonomous vehicle. In some implementations, for example, a location-based teleassist trigger may include a session suggestion that recommends that a teleassist session be initiated whenever an autonomous vehicle is approaching a predetermined location to enable a teleassist operator to provide guidance to an autonomous vehicle, e.g., to provide assistance in areas or scenarios where teleassist assistance is known to be useful such as construction areas, checkpoints, weigh stations, depot entries/exits, or any other complicated areas encountered by other autonomous vehicles.

In addition, in some implementations, a location-based teleassist trigger may include a suggested action, e.g., a suggested path to follow, a suggested lane to drive in, or any other actions that may be suggested by a teleassist operator, while the autonomous vehicle is operating in the area associated with the location-based criterion. A suggested action may also be presented in a teleassist session in some implementations. While both a session suggestion and a suggested action may be associated with a location-based teleassist trigger in some instances, in other instances, a suggested action may be used to potentially avoid the need to initiate a teleassist session, thereby enabling an autonomous vehicle to navigate through a potentially problematic area effectively without the assistance of a teleassist operator, but still using suggestions made by a teleassist operator when assisting another autonomous vehicle that has previously navigated through that area.

A location-based teleassist trigger in some implementations may also be associated with observation data collected by another autonomous vehicle in connection with a teleassist session conducted with that other autonomous vehicle, such that the observation data may be used by other autonomous vehicles. For example, the vehicle path of an autonomous vehicle participating in a teleassist session and/or the vehicle paths of other vehicles sensed by the autonomous vehicle, may be provided for use in association with a location-based teleassist trigger. Similarly, any optimal and/or sub-optimal actions performed by an autonomous vehicle during a teleassist session may be propagated to other autonomous vehicles through location-based teleassist triggers. Any other observation data, collected in association with a teleassist session, may also be propagated to other autonomous vehicles through location-based teleassist triggers, e.g., to assist the autonomous vehicle with controlling its motion and/or to assist another teleassist operator when initiating a new teleassist session with another autonomous vehicle.

The location-based criterion used by a location-based teleassist trigger may vary in different implementations. While in some implementations a criterion may merely specify a location that an autonomous vehicle triggers when within a predetermined distance of that location, in other implementations, more detailed criteria may be used, e.g., by defining a geofence that triggers whenever an autonomous vehicle enters the defined geofence, and/or by specifying a route, road, lane, direction, etc. for an autonomous vehicle (e.g., to avoid triggering when an autonomous vehicle is traveling in the opposite direction on a divided roadway), among others.

It will also be appreciated that the observation data maintained in a live map system in some implementations may be temporary or transitory in nature, given, for example, that construction zones may be removed or may change (e.g., to switch a lane closure from the left lane to the right lane). Thus, in some implementations it may be desirable to associate observation data with expiration times or durations such that, if similar observations are not collected by other autonomous vehicles for a period of time, the observation data may be automatically removed from the live map system. It may also be desirable to utilize an offline process to validate observation data and/or perform quality assurance on the observation data, potentially with the assistance of human operators, to remove unreliable observation data and/or to potentially propagate reliable observation data to an offline map system for inclusion in a global repository.

Other variations will be appreciated by those of ordinary skill having the benefit of the instant disclosure.

Figure 4:
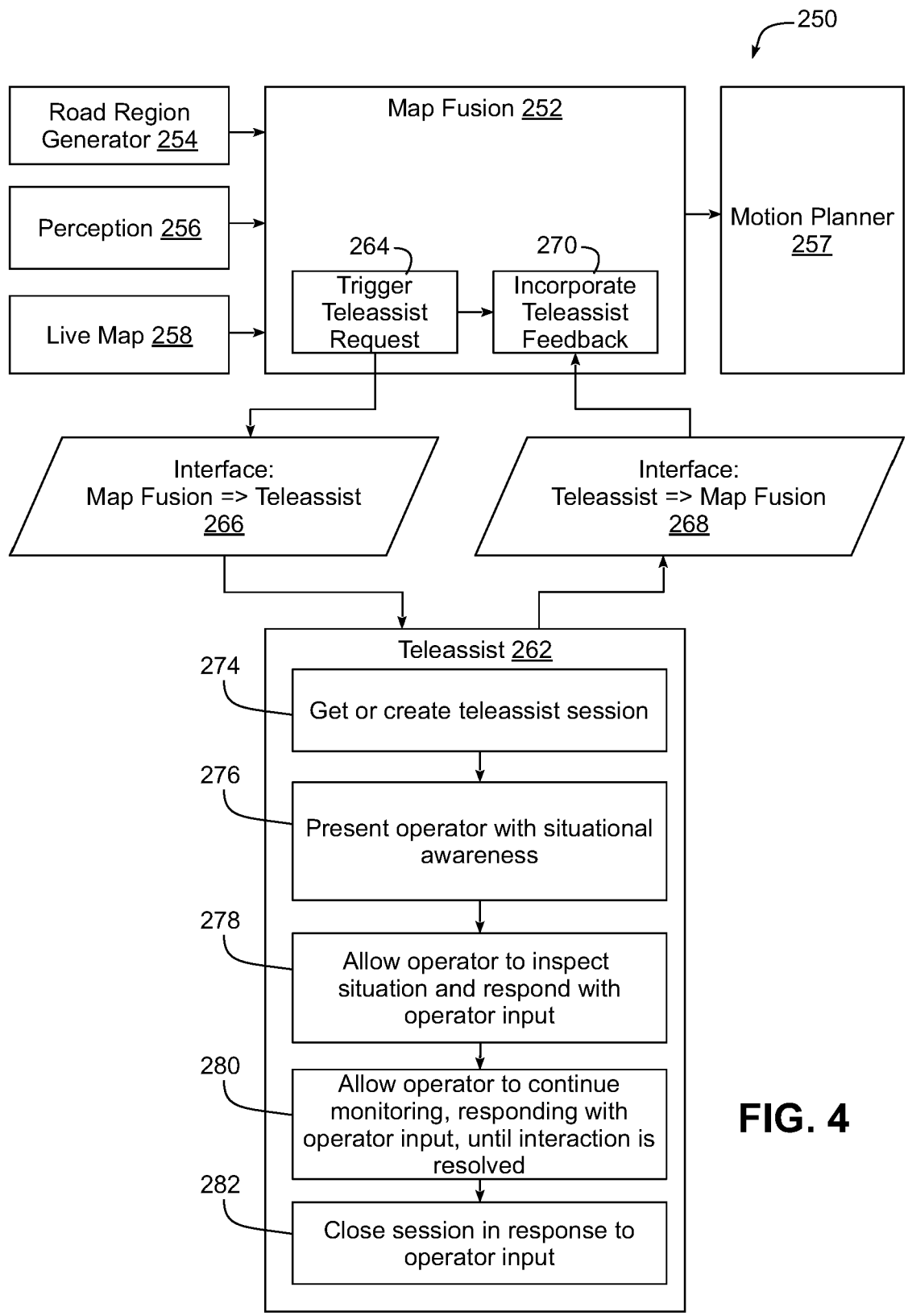
FIG. 4 is a block diagram illustrating autonomous vehicle interaction with example live map and teleassist systems consistent with some implementations.

FIG. 4 illustrates an example system 250 suitable for utilizing a live map system and a teleassist system to facilitate control of an autonomous vehicle in some implementations. In this implementation, a map fusion component 252 integrates or fuses various static elements mapped in the environment surrounding the autonomous vehicle by an offline map system (e.g., as provided by a road region generator 254 in the form of a road region layout) with various observations currently detected in the environment by a perception component 256 to generate a digital map that may be consumed by a motion planner component 257 to generate a path to be followed by the autonomous vehicle. The digital map may contain mapped static elements from the offline map system and perceived elements such as the tracks of detected but unmapped signs, unmapped construction elements, and other unmapped objects and elements detected in the environment, as well as various perceived lane boundaries detected in the environment. Observation data from the perception component 256 may therefore be used to supplement the stored map data with additional elements detected in the environment and/or changes to existing mapped elements and thereby provide a more current representation of the environment surrounding the autonomous vehicle.

In addition, a live map system 258 also provides observation data associated with observations collected by other autonomous vehicles to map fusion component 252 to augment the digital map with these other observations. As such, the augmented digital map provided to motion planner component 257 may include offline map data as well as observation data collected locally by the autonomous vehicle (from perception component 256) and by other autonomous vehicles operating in the same environment (from live map system 258).

In addition, live map system 258 may also provide a location-based teleassist trigger to map fusion component 252, e.g., to trigger a teleassist session with a remote teleassist system 262. In response, for example, to a location-based criterion of the location-based teleassist trigger being met, a request for a teleassist session (block 264) may be forwarded to a teleassist system 262, with the request being forwarded through an interface 266. Feedback generated by a teleassist operator during the teleassist session may then be received by map fusion component 252 through an interface 268 and incorporated to assist in operating the autonomous vehicle (block 270). Interfaces 266, 268 (which may be implemented in the same component in some implementations) may be used to respectively communicate data from map fusion component 252 to remote teleassist system 262, e.g., situational awareness information, and from remote teleassist system 262 back to map fusion component 252, e.g., operator suggestions, commands or requests for additional information.

For example, in response to a location-based teleassist trigger that triggers a teleassist request in block 264, remote teleassist system 262 may get or create a teleassist session (block 274) and provide situational awareness information to the teleassist operator (block 276). Situational awareness information or data may include any information or data that may be relevant to the current context of an autonomous vehicle and/or be useful to a teleassist operator during a teleassist session, e.g., a current path, the paths of other vehicles, map data for the area surrounding the autonomous vehicle, telemetry data, camera feed data and/or any other data that may be useful in connection with assessing the current situation encountered by the autonomous vehicle. Once the situational data is provided, the remote teleassist system waits for the operator to assess the situation and provide operator input (block 278), which is then incorporated in block 270 as discussed above. After providing the operator input to the autonomous vehicle, the operator may continue to monitor the operation of the autonomous vehicle and/or provide additional input (block 280) until the teleassist interaction is done, at which point the operator may close the session (block 282).

Figure 5:
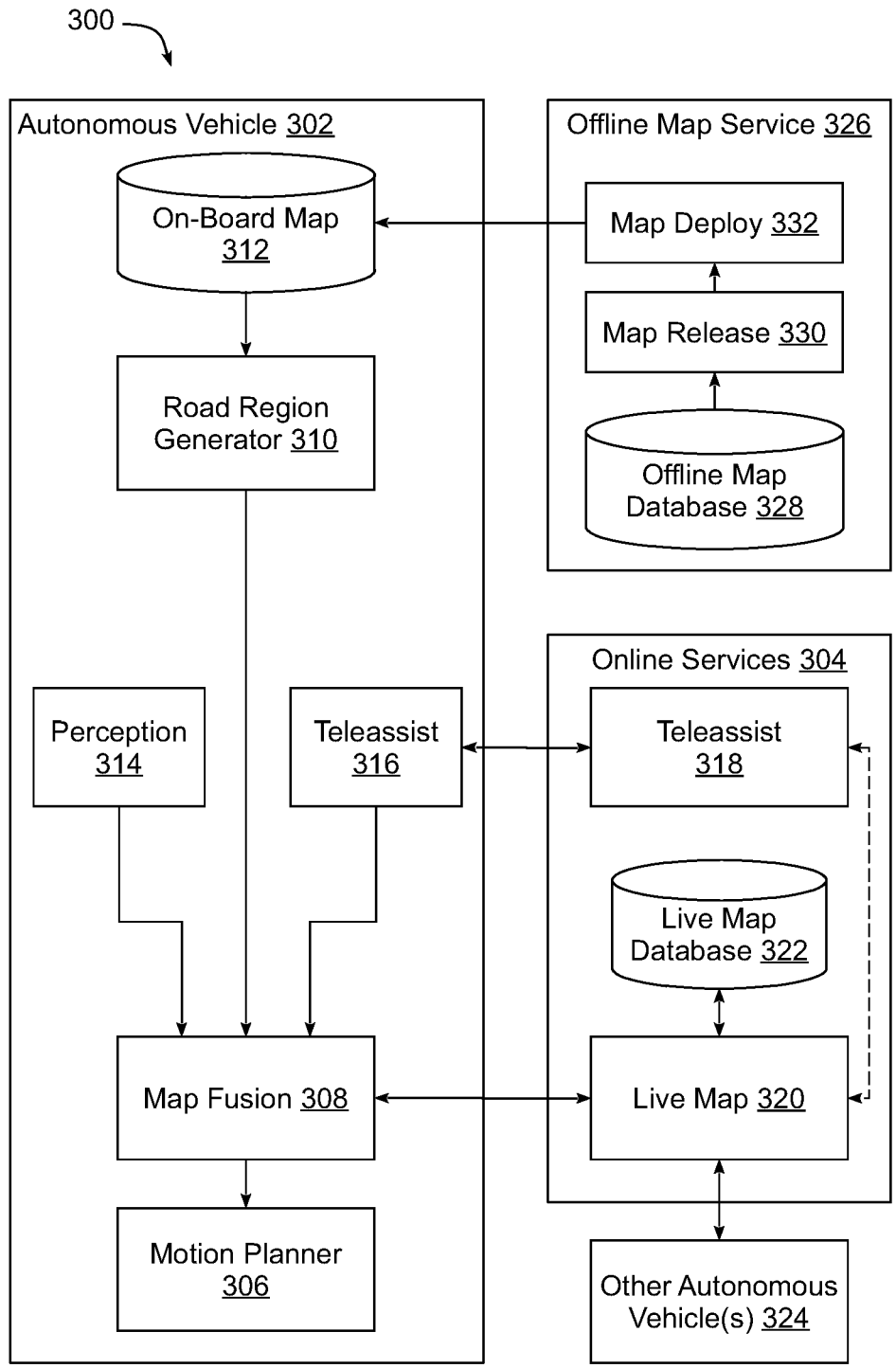
FIG. 5 is a block diagram illustrating a live map and teleassist-enabled system for controlling an autonomous vehicle consistent with some implementations.

FIG. 5 next illustrates an example live map and teleassist-enabled system 300 incorporating an autonomous vehicle 302 in communication with a set of online services 304. A motion planner component 306 receives data, e.g., an augmented road region layout, from a map fusion component 308. Similar to map fusion component 252 of FIG. 4, map fusion component 308 receives a digital map, e.g., a road region layout, from a road region generator component 310. Component 310 may generate a road region layout by accessing an on-board map 312 to retrieve offline map data suitable for generating a digital map of the environment surrounding autonomous vehicle 302 during operation. Map fusion component 308 also receives observation data from a perception component 314, which collects observations using one or more sensors in the manner discussed above. A perception component in some implementations may also provide tracks for various dynamic objects directly to motion planner component 306. Map fusion component 308 may also receive teleassist data, e.g., teleassist operator input, from a teleassist component 316 that is in communication with a remote teleassist system 318, as well as additional observation data from a live map system 320, such that the data collected from components 310, 314, 316 and 320 may be fused into the augmented road region layout used by motion planner component 306 when generating a path of motion for the autonomous vehicle.

The observation data provided by live map system 320 is stored in a live map database or data store 322, and includes observation data collected from one or more other autonomous vehicles 324. Live map system 320 is generally in bi-directional communication with both autonomous vehicle 302 and other autonomous vehicle(s) 324 to both collect observation data for autonomous vehicles 302, 324 and to propagate observation data collected by autonomous vehicles 302, 324 operating in a particular portion or region of the environment to other autonomous vehicles 302, 324 operating in the same portion or region of the environment. In addition, teleassist system 318 may also be in bi-directional communication with live map database 322 via live map system 320 to enable a teleassist operator to store teleassist data, e.g., location-based teleassist triggers, to be propagated to autonomous vehicles via live map system 302, as well as to retrieve observation data from live map database 322 in connection with conducting a teleassist session with autonomous vehicle 302. As noted above, teleassist system 318 may also be in bi-directional communication with autonomous vehicle 302 in some implementations (e.g., via teleassist component 316) to allow an autonomous vehicle to provide situational awareness data to a teleassist operator and to allow the teleassist operator to provide suggesting actions to the autonomous vehicle. In some implementations, no direct link may be present between teleassist system 318 and live map system 320, such that communication between these components may be handled through map fusion component 308 and teleassist component 316.

As also noted above, live map system 320 and live map database 322 are representative of an online map system that propagates observation data within an autonomous vehicle fleet, as opposed to an offline map service 326, e.g., an atlas system or service, that provides offline map data to the autonomous vehicle fleet. An offline map service 326, for example, may include an offline map database 328 that maintains a global repository of offline map data. A map release component 330 may be used to generate versioned updates of the offline map database, and a map deploy component 332 may be used to deploy or propagate the database updates to an autonomous vehicle fleet. It will be appreciated that a global repository of offline map data may be substantial in size, so in some implementations only a portion of the offline map data corresponding to the particular area (e.g., a city, a state, a county, etc. within which autonomous vehicle 302 operates) may be deployed to the autonomous vehicle and maintained in its on-board map 312. In addition, based upon movement of the autonomous vehicle into adjacent areas, additional portions of the offline map data may be communicated to the autonomous vehicle by service 326 such that the on-board map 312 includes sufficient offline map data to operate the autonomous vehicle at its current location.

Figure 6:
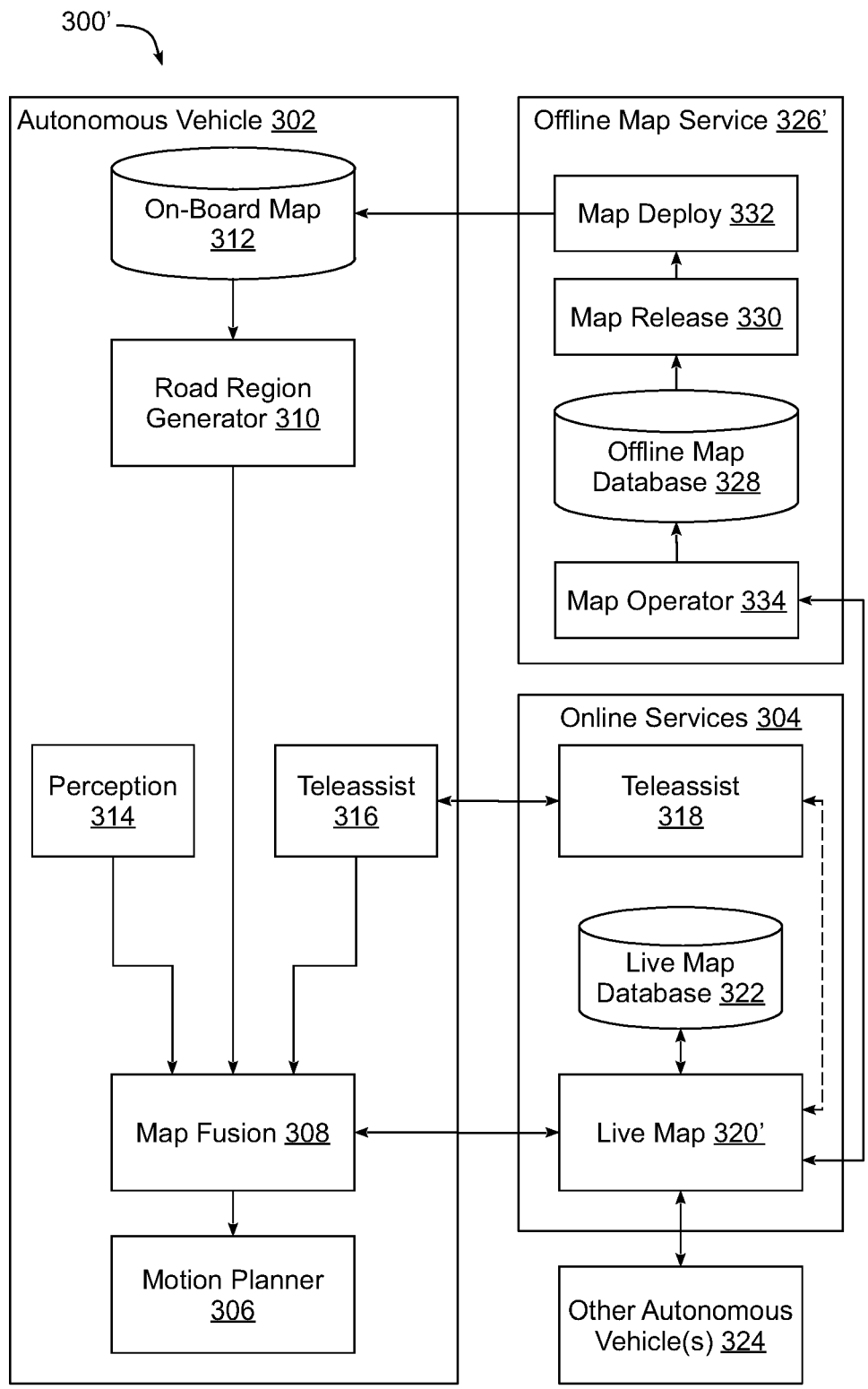
FIG. 6 is a block diagram illustrating another live map and teleassist-enabled system for controlling an autonomous vehicle consistent with some implementations.

In some implementations, live map system 320 and offline map service 326 may be completely independent from one another, while in other implementations, and as illustrated by system 300' of FIG. 6, a map operator component 334 of an offline map service 326' may be in communication with a live map system 320' to enable observation data collected by live map system 320' to be incorporated into offline map database 328. In such an approach, frequently changing observations, such as construction elements, may be maintained in both live map database 322 and offline map database 328 (potentially in a separate layer that has lower accuracy requirements than other offline map data), and such observations may be validated (e.g., by map operator component 334, optionally under the direction of a human operator) before being released and then given priority when they are loaded on the autonomous vehicle and are found to overlap with non-validated observation data from the live map database 322. In addition, such offline map data may utilize a similar automatic expiration policy to the observation data in live map database 322 to automatically expire the observations that are no longer present in the real world.

Other manners of partially or completely integrating a live map system with an offline map system may be used in other implementations, as will be appreciated by those of ordinary skill having the benefit of the instant disclosure.

Figure 7:
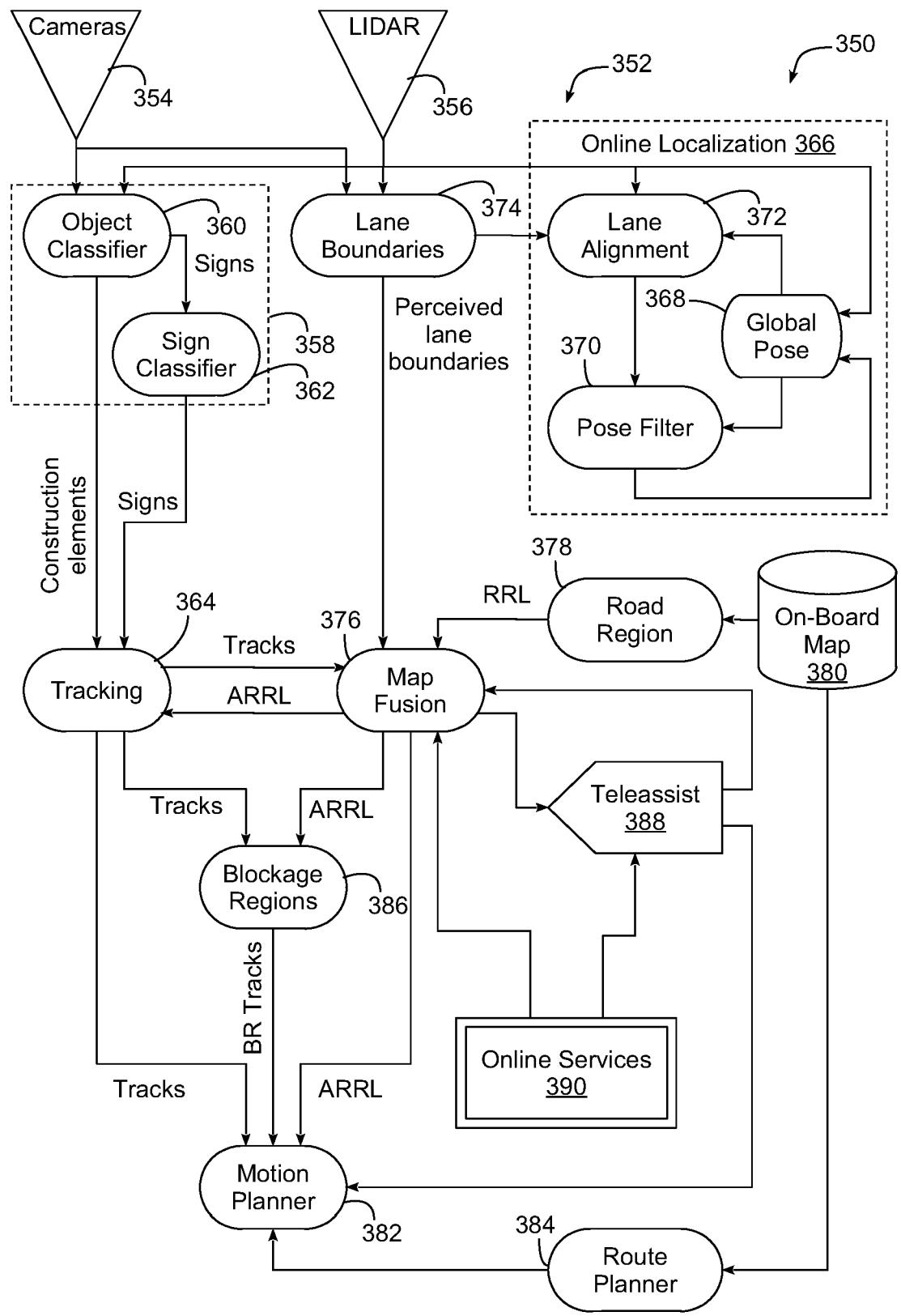
FIG. 7 is a block diagram illustrating an example live map and teleassist-enabled autonomous vehicle control system consistent with some implementations.

Now turning to FIG. 7, this figure illustrates an example autonomous vehicle 350 including an autonomous vehicle control system 352 that interfaces with both a live map system and a teleassist system in connection with autonomously operating autonomous vehicle 350. It will be appreciated that in other implementations, an autonomous vehicle control system may interface only with a teleassist system or only with a live map system, so the invention is not limited to the specific implementation discussed herein. In addition, FIG. 7 illustrates only the components of autonomous vehicle control system 352 related to motion and route planning, so other components that are unrelated to such functions are omitted from the figure for simplification purposes.

One or more image sensors or cameras 354 and one or more LIDAR sensors 356 operate as the sensors used in connection with motion planning. Camera(s) 354 output camera data to a perception component 358, and specifically to an object classifier component 360 that also receives output of LIDAR sensor(s) 356. Object classifier component 360 may be used to identify physical objects in the environment surrounding the autonomous vehicle. While component 360 may detect a wide variety of physical objects, from the perspective of the functionality described herein, two particular types of objects, construction elements and signs, are illustrated as being output by object classifier component 360. It will be appreciated, however, that the types of objects that may be detected are innumerable, and that a perception component may be configured to detect many other types of objects in other implementations, so the output of construction elements and signs as illustrated in FIG. 7 is merely for the purposes of explanation.

Perception component 358 may also include a sign classifier component 362 that receives the objects detected as being signs by object classifier component 360 and determines the logical significance of such signs, e.g., the type of sign (speed limit, warning, road closure, construction notification, etc.), whether the sign is cautionary or mandatory, a location and/or lane that is affected by the sign (e.g., right lane closed 2 miles ahead), etc. In other implementations, the functionality of components 360, 362 may be combined, or additional purpose-specific classifier components may be used.

The objects detected by perception component 358 are provided to a tracking component 364 that maintains tracks for each of the detected objects (as well as other stationary and/or moving objects detected in the environment) over time. It will be appreciated that since the autonomous vehicle is generally in motion, tracks may still be used to represent stationary objects since their relative location to the autonomous vehicle changes over time due to the movement of the autonomous vehicle itself.

LIDAR sensor(s) 356 may also provide output to other components in autonomous vehicle control system 352. For example, the output may also be provided to an online localization component 366 that determines the current location and orientation of the autonomous vehicle. A global pose component 368 may receive the output of LIDAR sensor(s) 356 to determine a global pose for the autonomous vehicle, which is output to a pose filter component 370 and fed back as an additional input to global pose component 368. The global pose may also be output to a lane alignment component 372 that receives as input the output of LIDAR sensor(s) 356 and the output of a lane boundaries component 374, and provides another input to pose filter 370, although in some implementations the global pose may not be an input to lane alignment component 372. Lane alignment may be an input used for determining a global pose in some implementations.

Lane boundaries component 374 receives the output of the cameras 354 and/or the LIDAR sensor(s) 356, and may be used, for example, to generate perceived lane boundaries based upon the output of cameras 354 and/or LIDAR sensor(s) 356. These lane boundaries may then be provided to lane alignment component 372 to refine the global pose based upon the lane boundaries sensed within the environment. Separate camera-based and LIDAR-based lane alignment models may be used in some implementations, with the former having greater range but lower accuracy and the latter having greater accuracy but shorter range. In some implementations, the camera-based model may be used, among other purposes, to detect map errors, and the LIDAR-based model may be used for lane alignment and global pose determination.

A map fusion component 376 receives as input the tracks output by tracking component 364 and the perceived lane boundaries from lane boundaries component 374, which together may be considered to represent at least a portion of the perception observation data collected by the sensors of the autonomous vehicle. In addition, a road region generator component 378 retrieves map data from on-board map 380 and generates a baseline road region layout (RRL) representing a digital map of the area road region surrounding the autonomous vehicle. Map fusion component 376 fuses these inputs together to generate an augmented road region layout (ARRL) that is provided to a motion planner component 382 that generates a path of motion for the autonomous vehicle at least partially upon the augmented road region layout.

Motion planner component 382 may also receive as input at least a portion of the tracks output by tracking component 364 and a desired route from a route planner component 384, which is generally generated from on-board map 308 and provides high level guidance as to a desired route to reach a desired destination. Furthermore, in some implementations, an additional blockage region component 386 may receive at least a portion of the tracks output by tracking component 364 and the augmented road region layout from map fusion component 376 in order to determine one or more blockage regions in the environment, which are output as additional tracks to motion planner component 382. As noted above, a blockage region may represent a portion of an environment that is considered to be non-drivable, and in some implementations may represent a collection of associated construction elements, e.g., a collection of cones, barrels and/or Jersey barriers that may collectively be considered to represent a boundary that an autonomous vehicle is not permitted to cross.

Moreover, a teleassist component 388 may be operatively coupled to map fusion component 376 and motion planner component 382 to provide an interface with a remote teleassist system (not shown in FIG. 7) Teleassist component 388 may output, for example, observation data to map fusion component 376 to incorporate into an augmented road region. One non-limiting example is a speed limit, e.g., to supply a maximum speed an autonomous vehicle may travel at in certain lanes or roadways, or within a construction zone. Teleassist component 388 may also output, for example, suggested actions to motion planner component 382, e.g., to change lanes in advance of a blockage region, to stop or pull over to the side of the road, etc. Teleassist component 388 may also receive an augmented road region layout from map fusion component 376 (or any of the other data collected thereby) to assist a remote teleassist operator in providing assistance to the autonomous vehicle during a teleassist session.

Online services 390, including a remote teleassist system and a live map system similar to that described above in connection with FIGS. 5-6, may be interfaced with map fusion component 376 and teleassist component 388, e.g., to provide observation data and/or location-based teleassist triggers to map fusion component 376 and to exchange information with a teleassist operator during a teleassist session.

It will be appreciated that the architecture of autonomous vehicle control system 352 is merely exemplary in nature, and other architectures may be used in other implementations. For example, among other possible variations, blockage region component 386 may alternatively be implemented within perception component 358 such that blockage regions are managed as tracks similar to construction elements and signs. It will also be appreciated that some or all of the components in autonomous vehicle control system 352 may be implemented using programmed logic and/or trained machine learning models, and that implementation of such components would be well within the abilities of those of ordinary skill having the benefit of the instant disclosure.

Figure 8:
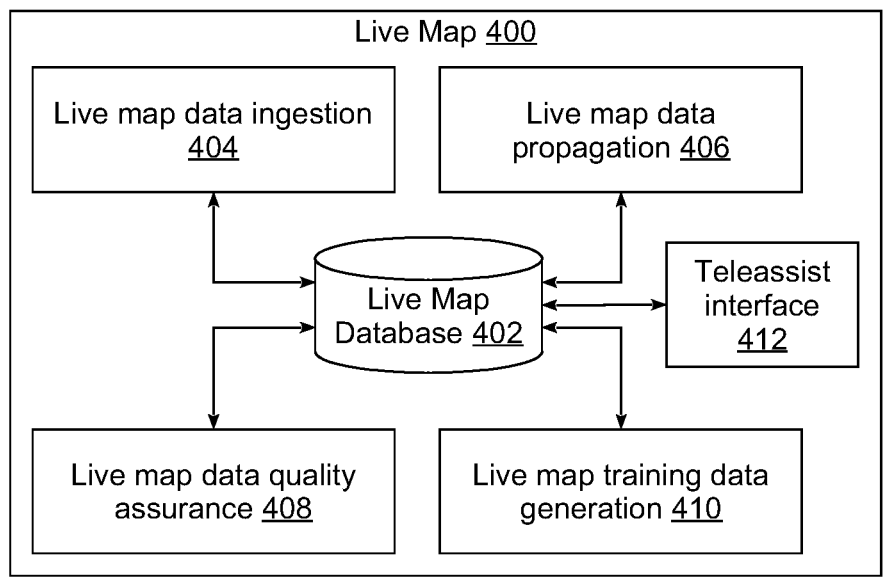
FIG. 8 is a block diagram illustrating a live map system consistent with some implementations, and capable of interacting with the autonomous vehicle control system of FIG. 7.

FIG. 8 illustrates an example implementation of a live map system 400. Live map system 400 includes a live map database 402 along with a live map data ingestion component 404, a live map propagation component 406, a live map data quality assurance component 408, a live map training data generation component 410 and a teleassist interface component 412. Live map data ingestion component 404 may be used to receive observation data forwarded by one or more autonomous vehicles and ingest that observation data into the live map database 402. Ingestion may also include correlating new observation data with previously stored observation data and assigning or modifying an expiration criterion for the observation data to control when observation data that is no longer being observed will be automatically removed from the database. Live map data propagation component 406 may be used to propagate observation data to autonomous vehicles in a fleet, e.g., based upon a request made by an autonomous vehicle for relevant observation data to that vehicle's current location, or pushed automatically based upon the tracked location of the autonomous vehicle. The map data propagation component 406 can propagate data to a map fusion component or directly to a teleassist component, for example.

Live map data quality assurance component 408 may be used to validate observation data received from autonomous vehicles, e.g., to reject incorrect or unreliable observation data, to correct or modify observation data, to propagate reliable observation data to an offline map system, etc. Component 408 may also provide an interface with a human operator, e.g., to determine when observation data is determined to be of sufficient reliability to incorporate into an offline map database. Live map training data generation component 410 may be used to generate training data for use in training various machine learning models, including, for example, machine learning models implemented within live map system 400 and/or machine learning models implemented within an autonomous vehicle control system. Teleassist interface 412 provides an interface to a teleassist system, e.g., to enable a teleassist operator to generate location-based teleassist triggers or communicate observation data between database 402 and a teleassist system.

Figure 9:
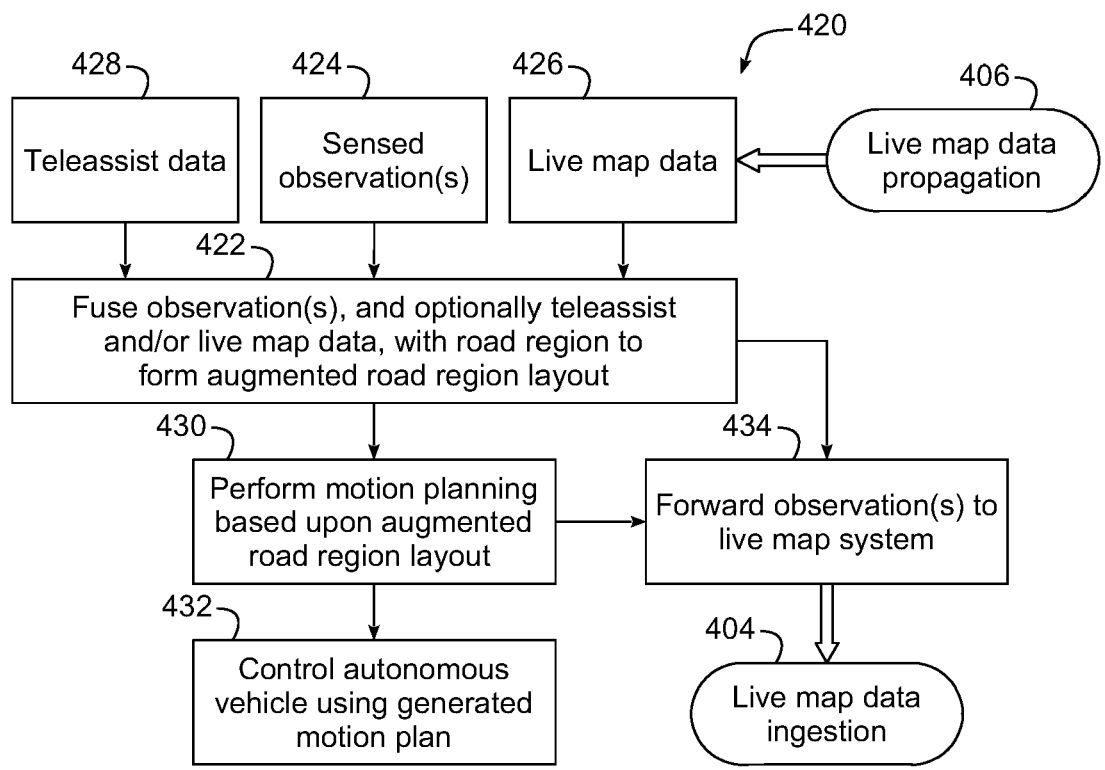
FIG. 9 is a flowchart illustrating an example operational sequence for controlling an autonomous vehicle using the autonomous vehicle control system and live map system of FIGS. 7-8.

Now turning to FIG. 9, this figure illustrates an example operational sequence 420 capable of being implemented within an autonomous vehicle control system to utilize a live map system and/or a teleassist system in connection with the control of an autonomous vehicle. As illustrated in block 422, a map fusion component may fuse various types of data to form an augmented road region layout. For example, perception observations, e.g., sensed by one or more sensors of the autonomous vehicle, may be provided in block 424, while live map data, e.g., observation data collected by other autonomous vehicles and/or location-based teleassist triggers, may be provided by live map data propagation component 406 in block 426. In addition, other teleassist data, provided by a teleassist system, may be provided in block 428.

Motion planning may then be performed based upon the augmented road region layout, e.g., by a motion planner component, to generate a motion plan (e.g., a path of motion) in block 430. The motion plan may then be used to control the autonomous vehicle in block 432. In addition, as illustrated in block 434, observation data collected from the autonomous vehicle, e.g., perception observation data collected from one or more sensors of the autonomous vehicle and/or the motion plan generated by the motion planner, among other data, may also be forwarded to the live map data ingestion component 404 of the live map system in block 434.

Figure 10:
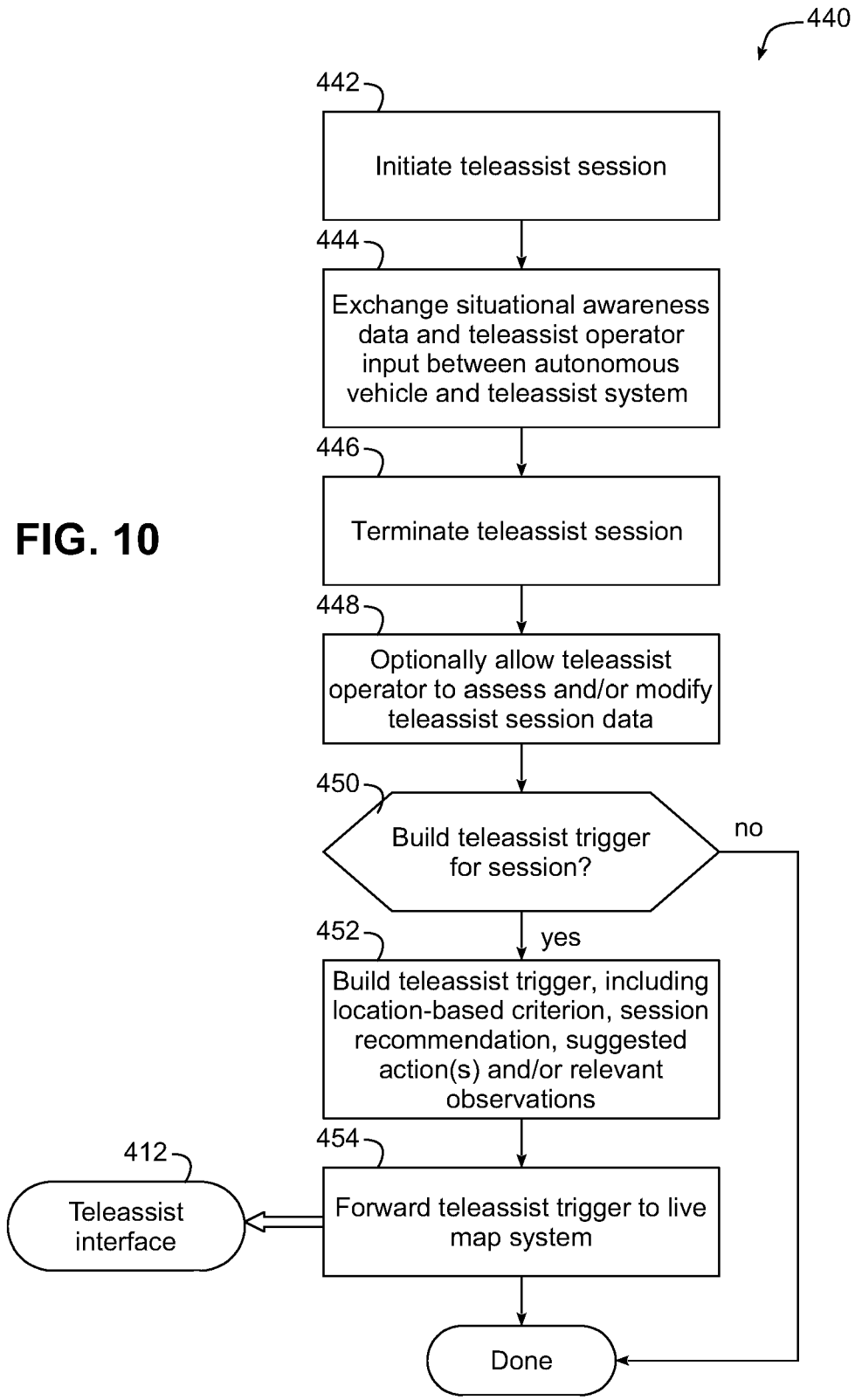
FIG. 10 is a flowchart illustrating an example operational sequence for generating and storing a location-based teleassist trigger in the live map system of FIG. 8.
Figure 11:
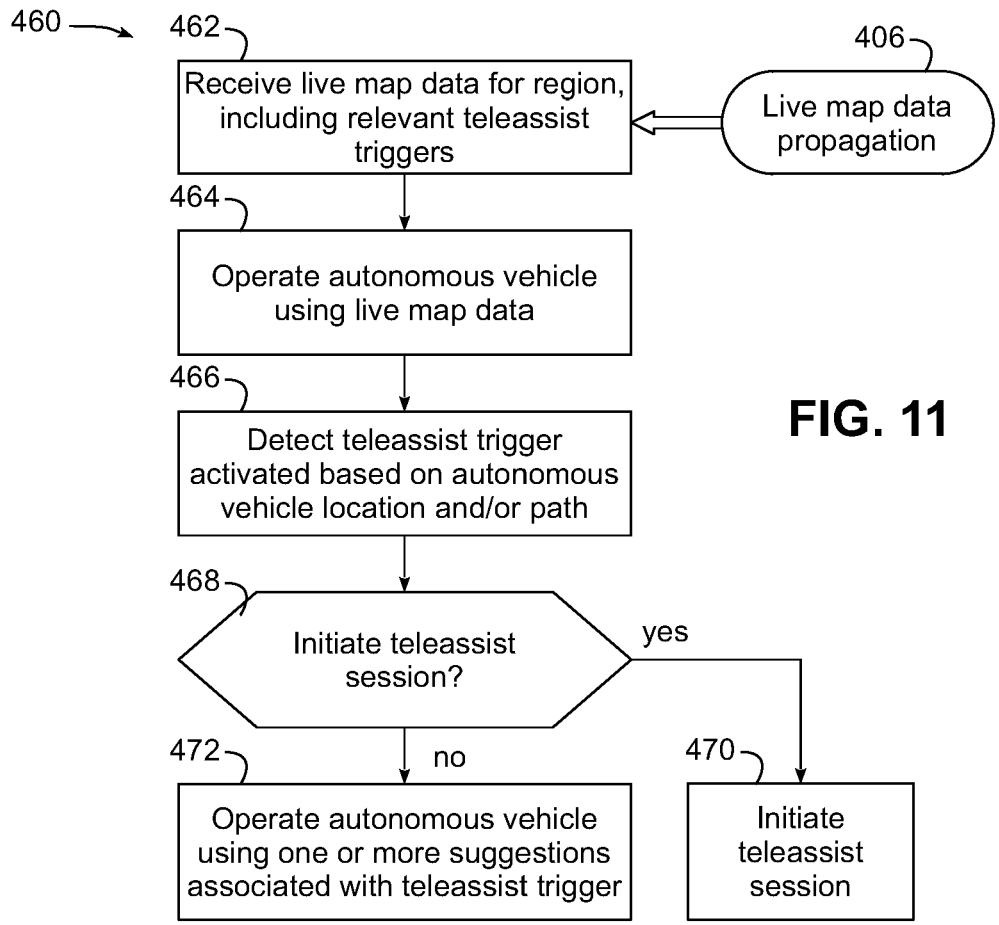
FIG. 11 is a flowchart illustrating an example operational sequence for activating a location-based teleassist trigger using the autonomous vehicle control system and live map system of FIGS. 7-8.

FIGS. 10 and 11 next illustrate the generation and triggering of location-based teleassist triggers, respectively. FIG. 10, in particular, illustrates an example operational sequence 440 for generating and storing a location-based teleassist trigger in live map system 400 of FIG. 8. Operational sequence 440 in some implementations may be performed at least in part by a teleassist system such as teleassist system 318 of FIG. 6, and interfaced with live map system 400 through teleassist interface 412. In implementations where at least a portion of the operational sequence is performed in an autonomous vehicle, a map fusion component may also perform at least some of the operations, and in some instances, may be used to trigger teleassist sessions based upon live map data received by the autonomous vehicle. As illustrated in blocks 442-446, a teleassist session may be initiated (block 442), and during the session, situational awareness data and teleassist operator input may be exchanged between the autonomous vehicle and the teleassist system (block 444), until at some point the teleassist session is terminated (block 446). Next, in block 448, the teleassist operator may optionally be permitted to assess and/or modify any teleassist session data, e.g., to determine whether any of the teleassist session data should be incorporated into the live map database, discarded, or otherwise.

Next, in block 450, a determination is made (e.g., by a teleassist operator, or alternatively, in an automated fashion by the teleassist system) as to whether a location-based teleassist trigger should be generated for the teleassist session. For example, it may be determined that a particular section of roadway, e.g., a construction zone, is triggering teleassist session requests from multiple autonomous vehicles, whereby it may be desirable to trigger a new teleassist session with any vehicle approaching the same section at an earlier point in time so a teleassist operator can have additional time to assist the autonomous vehicle. As another example, it may be determined that a particular action suggested for the particular section of roadway during the teleassist session, or a particular path suggested during the teleassist session, resulted in optimal or even adequate performance, such that it may be desirable to notify another vehicle approaching the same section so that the other vehicle can implement the same action or follow the same path, potentially without even having to initiate a teleassist session that it would otherwise have to initiate absent the suggestion. As yet another example, certain types of signs and/or construction elements that have been identified with a threshold confidence (either by a single autonomous vehicle or multiple autonomous vehicles) could be used to identify a particular section of roadway for which it may be desirable to proactively trigger teleassist sessions for other autonomous vehicles.

If no location-based teleassist trigger is suggested, sequence 440 may complete. Otherwise, control passes to block 452 to build a teleassist trigger, including one or more of a location-based criterion, a session recommendation (e.g., to automatically trigger a session), a suggested action (e.g., to propose actions to be undertaken by the autonomous vehicle), and any relevant observations that may be useful to the autonomous vehicle and/or to an operator of a later-initiated teleassist session. The relevant observations may include perception and/or operational observations, and may include, for example, any optimal or sub-optimal actions undertaken, paths of other vehicles (autonomous and/or non-autonomous), etc. The teleassist trigger is then forwarded to the live map system in block 454.

FIG. 11 illustrates an example operational sequence 460 for activating a location-based teleassist trigger using the autonomous vehicle control system and live map system of FIGS. 7-8. In particular, in block 462, an autonomous vehicle control system receives live map data for its current region from the live map system, via live map data propagation component 406. In this instance, the live map data includes, in lieu of or in addition to observation data, one or more location-based teleassist triggers associated with the autonomous vehicle's current region. As illustrated in block 464, the autonomous vehicle is thereafter operated in part using the live map data, and at some point, as represented in block 466, a location-based criterion of a teleassist trigger is determined to have been met based upon the autonomous vehicle location and/or path. For example, triggering may occur based upon crossing a geofence, being within a predetermined distance from a predetermined location and on a particular roadway or lane, etc.

In block 468, a determination is made as to whether a teleassist session should be initiated, e.g., if a positive session recommendation is associated with the location-based teleassist trigger. If so, control passes to block 470 to automatically initiate a teleassist session. If not, control instead passes to block 472 to operate the autonomous vehicle based upon one or more suggestions (e.g., suggested actions, suggested paths, etc.) associated with the teleassist trigger. It will also be appreciated that in some implementations, a trigger may include both a suggested action and a positive session recommendation, such that each of blocks 470 and 472 may be performed for a single teleassist trigger.

Figure 12:
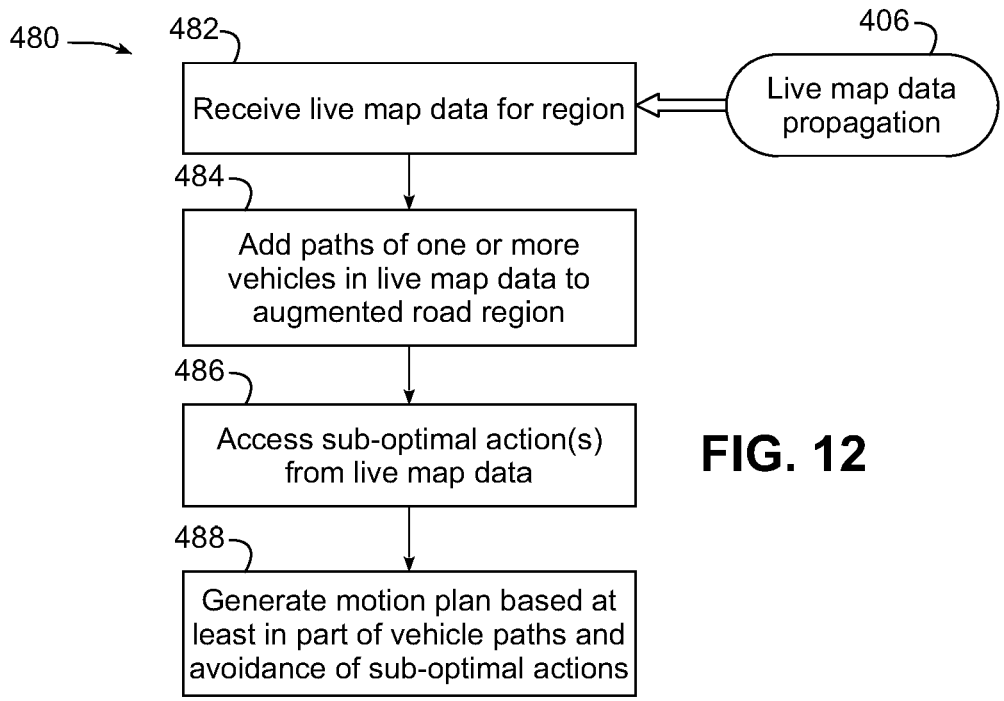
FIG. 12 is a flowchart illustrating an example operational sequence for controlling an autonomous vehicle based upon other vehicle paths and/or sub-optimal actions using the autonomous vehicle control system and live map system of FIGS. 7-8.

FIG. 12 next illustrates an example operational sequence 480 for controlling an autonomous vehicle based upon other vehicle paths and/or sub-optimal actions using the autonomous vehicle control system and live map system of FIGS. 7-8. In particular, in block 482, an autonomous vehicle control system receives live map data for its current region from the live map system, via live map data propagation component 406. In block 484, the paths of one or more vehicles, stored as observations in the live map data, may be added to the augmented road region layout used by the motion planner. These paths may include, for example, the paths used by other autonomous vehicles when traversing through a particular section of roadway, which may provide hints to the motion planner as to how other autonomous vehicles navigated through the same section. These paths may also include, in lieu of or in addition to the paths generated by other autonomous vehicles, the paths of other (including non-autonomous) vehicles sensed by the sensors of other autonomous vehicles. Thus, for example, if a particular autonomous vehicle follows behind one or more human-operated vehicles through a section of roadway, the track(s) representing the path(s) of the vehicle(s) tracked via the perception system of the autonomous vehicle may be used to provide hints to the motion planner as to how human drivers chose to navigate through the same section. As a result, a motion planner may choose a motion plan that desirably mimics the path(s) of one or more other vehicles based on the live map data.

In addition, in block 486, one or more sub-optimal actions undertaken by other autonomous vehicles may be accessed from the live map data. Thus, for example, if another autonomous vehicle had to stop, suddenly slow down, pull over, or suddenly change direction when navigating through the same section of roadway, the motion planner may choose to reject any path that would result in a similar outcome for the autonomous vehicle. As such, in block 488, the motion planner may utilize the added paths and/or sub-optimal actions to generate a suitable motion plan for the autonomous vehicle.

Figure 13:
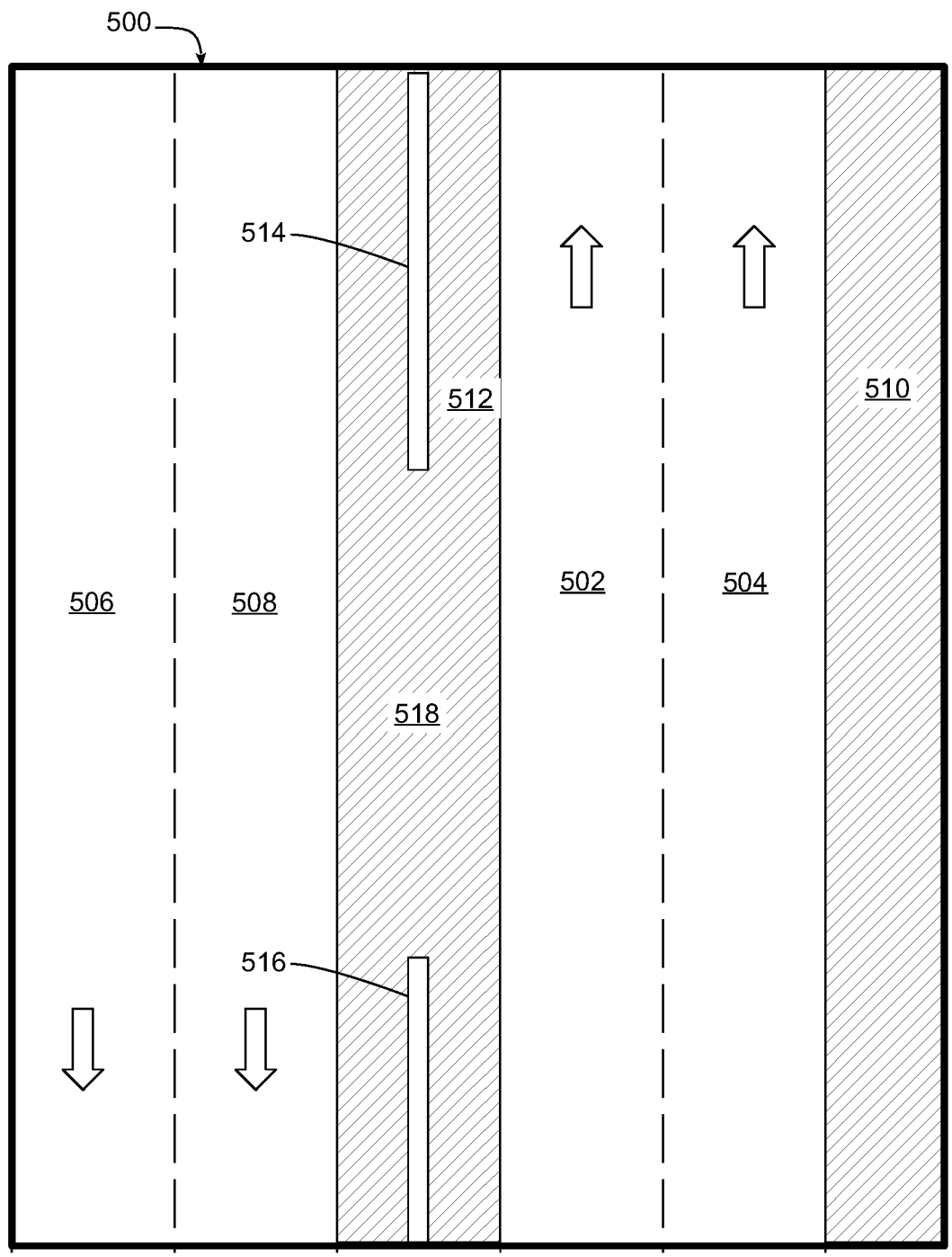
FIG. 13 and FIG. 14 are block diagrams illustrating an example fusion of live map data with a road region layout to generate an augmented road region layout using the autonomous vehicle control system and live map system of FIGS. 7-8.
Figure 14:
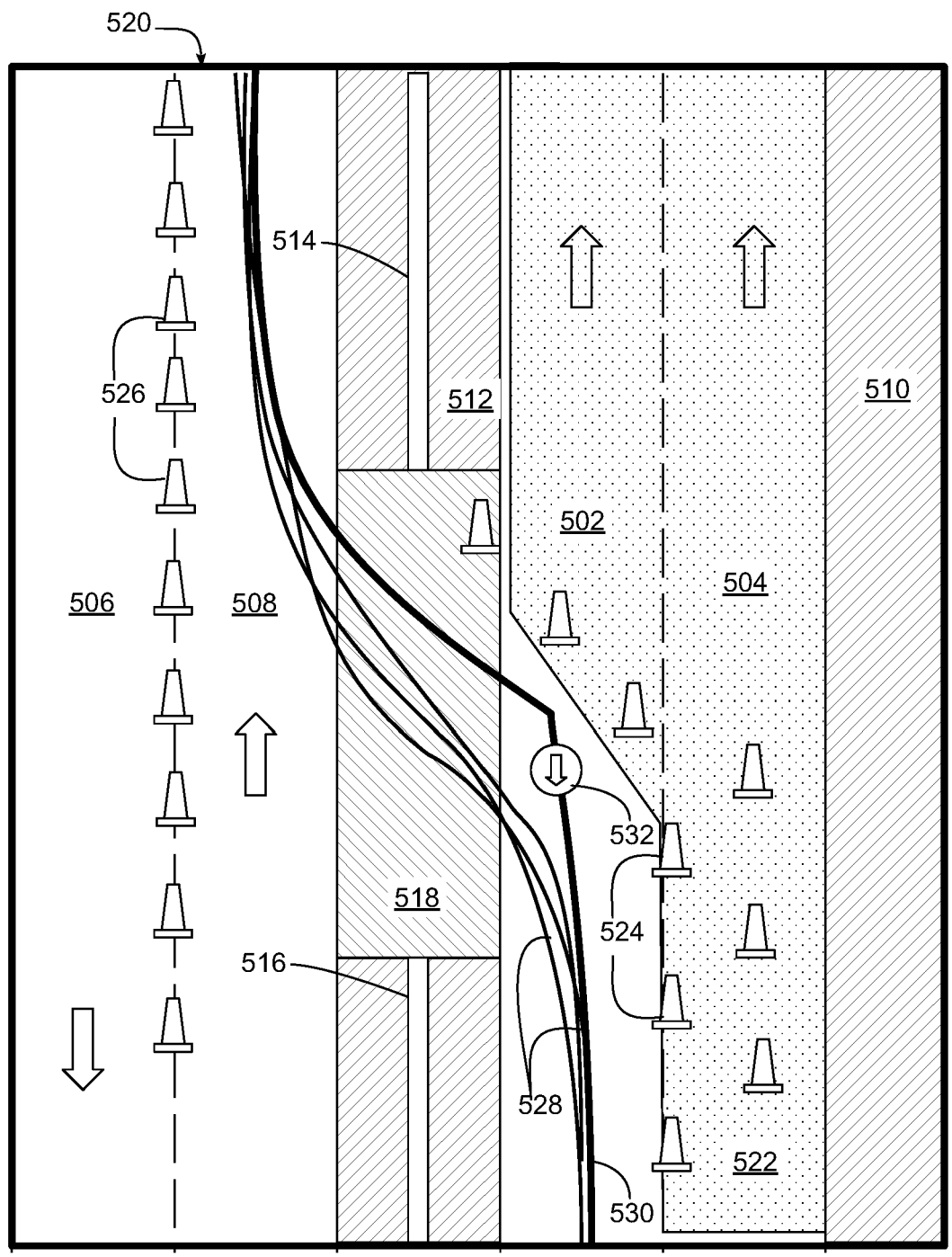

FIGS. 13-14 next illustrate an example fusion of live map data with a road region layout to generate an augmented road region layout using the autonomous vehicle control system and live map system of FIGS. 7-8. FIG. 13, for example, illustrates a road region layout 500 generated from offline map data for an example four-lane divided highway, including a pair of northbound lanes 502, 504, a pair of southbound lanes 506, 508, a shoulder 510, and a median 512. Two dividing walls 514, 516 are separated by a break 518, e.g., to allow police or emergency vehicles to cross over, but the break is not considered to be a drivable area for regular vehicles via laws or regulations. The arrows in each of lanes 502-508 also represent logical map data that define the normal direction of travel in each lane.

FIG. 14 illustrates an augmented road region layout 520 generated through the fusion of observation data from a live map system with the road region layout 500 of FIG. 13, e.g., after a construction zone is established that (a) closes lanes 502 and 504, (b) routes northbound traffic through break 518 and into lane 508, and (c) requires all southbound traffic to travel in lane 506. As an example, observation data such as a blockage region 522 associated with a plurality of construction elements 524 may be fused into augmented road region layout 520. Blockage region 522 and/or construction elements 524 in some instances may be perception observations from the autonomous vehicle being controlled as it travels through the construction zone, or alternatively, may be observation data collected by other autonomous vehicles and propagated through the live map system. It will be appreciated, however, that other observation data, e.g., construction elements 526, may not be perceptible as the autonomous vehicle being controlled travels through the construction zone, so may be representative of the observation data collected from other autonomous vehicles.

In addition, fused observation data may be used to override offline map data, e.g., whereby break 518 is effectively opened to traffic, lanes 502 and 504 are closed to traffic, and the direction of travel for lane 508 is reversed.

Furthermore, the observation data may include the paths 528 of other autonomous and/or non-autonomous vehicles that have traveled through the construction zone, which may be usable by a motion planner to select a path of motion that is similar to those of other vehicles. In addition, the observation data may also include sub-optimal actions, e.g., as represented by a path 530 that required a sudden change in direction and reduction in speed (as represented at 532) when traveling through the construction zone. A motion planner may use the sub-optimal action to select a path of motion that does not replicate the undesirable result of the sub-optimal action.

It will be appreciated that, while certain features may be discussed herein in connection with certain implementations and/or in connection with certain figures, unless expressly stated to the contrary, such features generally may be incorporated into any of the implementations discussed and illustrated herein. Moreover, features that are disclosed as being combined in some implementations may generally be implemented separately in other implementations, and features that are disclosed as being implemented separately in some implementations may be combined in other implementations, so the fact that a particular feature is discussed in the context of one implementation but not another should not be construed as an admission that those two implementations are mutually exclusive of one another. Other variations will be apparent to those of ordinary skill. Therefore, the invention lies in the claims hereinafter appended.

What is claimed is:

1. An autonomous vehicle control system, comprising:
    an on-board map configured to store offline map data of a portion of an environment within which an autonomous vehicle operates, the offline map data validated by an offline process and received by the on-board map as a versioned update deployed to a fleet of autonomous vehicles, the offline map data defining a plurality of static elements within the portion of the environment; and
    one or more processors configured to execute:
        a generator component that generates, using one or more instructions executed by the one or more processors, a baseline digital map of an area surrounding the autonomous vehicle from offline map data stored in the on-board map;
        a perception component that generates, using one or more instructions executed by the one or more processors, first observation data collected from one or more sensors of the autonomous vehicle;
        a map fusion component disposed downstream of the generator component and the perception component and configured to, using one or more instructions executed by the one or more processors, receive the baseline digital map from the generator component, the first observation data from the perception component, and second observation data from a remote live map system and associated with one or more observations collected from the environment by one or more other autonomous vehicles in the fleet of autonomous vehicles and not represented in the offline map data for the portion of the environment, wherein the map fusion component is further configured to fuse the first observation data and the second observation data with the baseline digital map data to generate an augmented digital map; and
        a motion planner component disposed downstream of the map fusion component and configured to, using one or more instructions executed by the one or more processors, receive the augmented digital map and generate a trajectory for the autonomous vehicle from the augmented digital map;
    wherein the one or more processors are further configured to control the autonomous vehicle using the trajectory generated by the motion planner component.

2. The autonomous vehicle control system of claim 1, wherein the offline map data is generated from aggregated observations collected by and/or verified by multiple autonomous vehicles in the fleet of autonomous vehicles.

3. The autonomous vehicle control system of claim 1, wherein the one or more observations includes at least one perception observation of a stationary sign, construction element, boundary, or blockage region.

4. The autonomous vehicle control system of claim 3, wherein the map fusion component is configured to fuse the first observation data and the second observation data with the baseline digital map data to generate the augmented digital map by overriding at least a portion of the baseline digital map based upon the at least one perception observation of the stationary sign, construction element, boundary, or blockage region.

5. The autonomous vehicle control system of claim 1, wherein the map fusion component is configured to generate the augmented digital map while maintaining the offline map data unaltered in the on-board map.

6. The autonomous vehicle control system of claim 1, wherein the one or more processors are further configured to communicate at least a portion of the first observation data to the remote live map system for use in controlling one or more other autonomous vehicles operating in the environment.

7. The autonomous vehicle control system of claim 1, wherein at least a portion of the second observation data is associated with an expiration policy that automatically removes the portion of the second observation data from the remote live map system.

8. The autonomous vehicle control system of claim 1, wherein the second observation data defines one or more vehicle paths, each vehicle path associated with a detected path of a different vehicle when traveling through the environment, wherein the map fusion component is configured to fuse the first observation data and the second observation data with the baseline digital map data to generate the augmented digital map by fusing the one or more vehicle paths with the baseline digital map, and wherein the motion planner component is configured to generate the trajectory for the autonomous vehicle from the augmented digital map by using the one or more vehicle paths to determine a path of motion for the autonomous vehicle.

9. The autonomous vehicle control system of claim 1, wherein the second observation data defines a sub-optimal action performed by another autonomous vehicle when traveling through the environment, wherein the map fusion component is configured to fuse the first observation data and the second observation data with the baseline digital map data to generate the augmented digital map by fusing the sub-optimal action with the baseline digital map, and wherein the motion planner component is configured to generate the trajectory for the autonomous vehicle from the augmented digital map by using the sub-optimal action to determine a path of motion for the autonomous vehicle.

10. The autonomous vehicle control system of claim 1, wherein the map fusion component is further configured to receive teleassist data from a remote teleassist system, and to fuse the teleassist data with the baseline digital map data when generating the augmented digital map.

11. The autonomous vehicle control system of claim 1, wherein the one or more processors are further configured to:
receive, from the remote live map system, a location-based teleassist trigger; and
determine activation of the location-based teleassist trigger based at least in part on a location-based criterion associated with the location-based teleassist trigger.

12. The autonomous vehicle control system of claim 11, wherein the one or more processors are further configured to, in response to determining activation of the location-based teleassist trigger, automatically initiate a teleassist session with a remote teleassist system.

13. The autonomous vehicle control system of claim 11, wherein the one or more processors are further configured to, in response to determining activation of the location-based teleassist trigger, control the autonomous vehicle based at least in part on a suggested action associated with the location-based teleassist trigger and without initiating a teleassist session with a remote teleassist system.

14. The autonomous vehicle of claim 13, wherein the suggested action is received from the remote live map system and generated from a different teleassist session with a different autonomous vehicle.

15. The autonomous vehicle of claim 1, wherein the perception component includes an object classifier component configured to detect construction elements and/or signs using the one or more sensors of the autonomous vehicle, the first observation data received by the map fusion component identifies at least one construction element or sign detected in the environment, and the map fusion component fuses the at least one construction element or sign with the baseline digital map data when generating the augmented digital map.

16. The autonomous vehicle of claim 15, wherein the perception component further includes a sign classifier component configured to determine a logical significance of a first sign detected by the object classifier component, the first observation data received by the map fusion component identifies the logical significance of the first sign detected in the environment, and the map fusion component fuses the logical significance of the first sign with the baseline digital map data when generating the augmented digital map.

17. The autonomous vehicle of claim 15, wherein the one or more processors are further configured to execute a tracking component that determines a track for the identified at least one construction element or sign detected in the environment, the first observation data received by the map fusion component that identifies the at least one construction element or sign detected in the environment includes the track determined by the tracking component, and the map fusion component fuses the track with the baseline digital map data when generating the augmented digital map.

18. The autonomous vehicle of claim 1, wherein the perception component further includes a lane boundaries component that determines one or more perceived lane boundaries using the one or more sensors of the autonomous vehicle, the first observation data received by the map fusion component identifies the one or more perceived lane boundaries, and the map fusion component fuses the one or more perceived lane boundaries with the baseline digital map data when generating the augmented digital map.

19. A method of operating an autonomous vehicle with an autonomous vehicle control system comprising one or more processors, comprising:
storing, in an on-board map, offline map data of a portion of an environment within which the autonomous vehicle operates, the offline map data validated by an offline process and received by the on-board map as a versioned update deployed to a fleet of autonomous vehicles, the offline map data defining a plurality of static elements within the portion of the environment;
with a generator component that executes instructions on the one or more processors, generating a baseline digital map of an area surrounding the autonomous vehicle from offline map data stored in the on-board map;
with a perception component that executes instructions on the one or more processors, generating first observation data collected from one or more sensors of the autonomous vehicle;
with a map fusion component disposed downstream of the generator component and the perception component and that executes instructions on the one or more processors, receiving the baseline digital map from the generator component, the first observation data from the perception component, and second observation data from a remote live map system and associated with one or more observations collected from the environment by one or more other autonomous vehicles in the fleet of autonomous vehicles and not represented in the offline map data for the portion of the environment;
with the map fusion component, fusing the first observation data and the second observation data with the baseline digital map data to generate an augmented digital map;
with a motion planner component disposed downstream of the map fusion component and that executes instructions on the one or more processors, receiving the augmented digital map and generating a trajectory for the autonomous vehicle from the augmented digital map; and controlling the autonomous vehicle using the trajectory generated by the motion planner component.

\* \* \* \* \*